United States Patent [19]

Leger

[11] Patent Number: 5,627,847
[45] Date of Patent: May 6, 1997

[54] DISTORTION-COMPENSATED PHASE GRATING AND MODE-SELECTING MIRROR FOR A LASER

[75] Inventor: James R. Leger, Plymouth, Minn.

[73] Assignee: Regents of the University of Minnesota, Minneapolis, Minn.

[21] Appl. No.: 433,815

[22] Filed: May 4, 1995

[51] Int. Cl.$^6$ ..................................................... H01S 3/10
[52] U.S. Cl. ............................ 372/9; 372/102; 372/108; 372/99; 359/559
[58] Field of Search ........................................ 372/9, 98, 99, 372/102, 108, 34; 359/559, 16

[56] References Cited

U.S. PATENT DOCUMENTS

| | | | |
|---|---|---|---|
| 4,275,454 | 6/1981 | Klooster, Jr. | 359/559 |
| 4,991,177 | 2/1991 | Chang et al. | 359/559 |
| 5,033,060 | 7/1991 | Leger | 372/99 |
| 5,255,283 | 10/1993 | Bélanger et al. | 372/99 |
| 5,454,004 | 9/1995 | Leger | 372/102 |
| 5,477,554 | 12/1995 | Yoshii et al. | 372/9 |
| 5,513,022 | 4/1996 | Son et al. | 359/16 |

FOREIGN PATENT DOCUMENTS

0009108A2  8/1979  European Pat. Off. .

OTHER PUBLICATIONS

Casperson, "Phase Compensation of Laser Beam Modes", *Optical and Quantum Electronics*, vol. 8, pp. 537–544 (1976).

J.R. Leger, "Design and Applications of Diffractive Optics in Laser Systems", *Technical Digest of Opt. Soc. Am. Annual Meeting*, Dallas, TX, 135 (Oct. 5, 1994).

J. R. Leger, et al., "Customized Laser Modes Using a Phase Grating and Mode Selecting Mirror," *Tech. Digest of Conf. Lasers and Electroopt.*, Series vol. II, Anaheim, CA, 411–412, May 8–13, 1994.

James R. Leger, et al., "Diffractive Optical Element for Mode Shaping of a Nd: YAG Laser," *Opt. Lett.* 19 108–110 (Jan. 15, 1994.).

James R. Leger, et al., "Mode Shaping of a Nd–YAG Laser with Diffractive Mirrors," *IEEE LEOS Annual Meeting Conference Proceedings*, San Jose, CA, 681–682 (Nov. 15–18 1993).

J. R. Leger et al., "Modal properties of an external diode–laser–array cavity with phase conjugate optics," 8th Interdisciplinary Laser Science Conf., Albuquerque, NM (Nov. 1992); *Bulletin of the American Physical Society* 37, 1212 (Sep. 1992).

J. R. Leger, "Applications of Diffractive Optics to Semiconductor Laser Arrays," *Optical Design for Photonics Topical Meeting*, Paul Springs, CA, 2–5 (Mar. 22–24, 1993).

James Leger, "Customizing Laser Cavities with Diffractive Optical Elements," (Abstract Only), *Tech. Digest of Opt. Soc. of Am. Annual Meeting*, Toronto, 140 (Oct. 3–8, 1993).

(List continued on next page.)

*Primary Examiner*—Leon Scott, Jr.
*Attorney, Agent, or Firm*—Schwegman, Lundberg, Woessner & Kluth, P.A.

[57] ABSTRACT

Method for making a distortion-compensating phase-adjustment element for a laser. One type of distortion to be compensated for is heat distortion. Also described is a method for making a custom phase-conjugating diffractive mirror for a laser resonator comprising the steps of: (a) choosing a specified beam mode profile $a_1(x,y)$, (b) calculating the mode profile $b(x',y')$ which is a value of the specified beam $a_1(x,y)$ that is propagated to the reflection surface of the diffractive mirror and (c) calculating mirror reflectance $t(x',y')$ which reflects phase conjugate of $b(x',y')$ and corrects for distortions such as heat. A method for fabricating such a mirror is shown. Another aspect of the invention is the addition of a phase adjusting element into a laser resonator, and compensating for the addition of a phase adjusting element in the design of other phase-adjusting elements such as the mirrors and correcting for distortions such as heat.

45 Claims, 16 Drawing Sheets

OTHER PUBLICATIONS

P. A. Bélanger and C. Paré, "Optical resonators using graded-phase mirrors," *Opt. Lett.* 16,1057–1059 (Jul. 15, 1991).

P. A. Bélanger, R. L. Lachance and C. Paré, "Super-Gaussian output from a $CO_2$ laser by using a graded-phase mirror resonator," *Opt. Lett.* 17, 739–741 (1992).

C. Paré and Pierre–André Bélanger, "Custom laser resonators using graded-phase mirrors," *IEEE J. Quantum Electron.* QE–28, 355–362 (Jan. 1992).

J. Auyeung, D. Fekete, D.M. Pepper, and A. Yari, "A Theoretical and Experimental Investigation of the Modes of Optical Resonators with Phase–Conjugate Mirrors" *IEEE J. Quantum Electron,* QE–15, 1180–1188 (Oct. 1979).

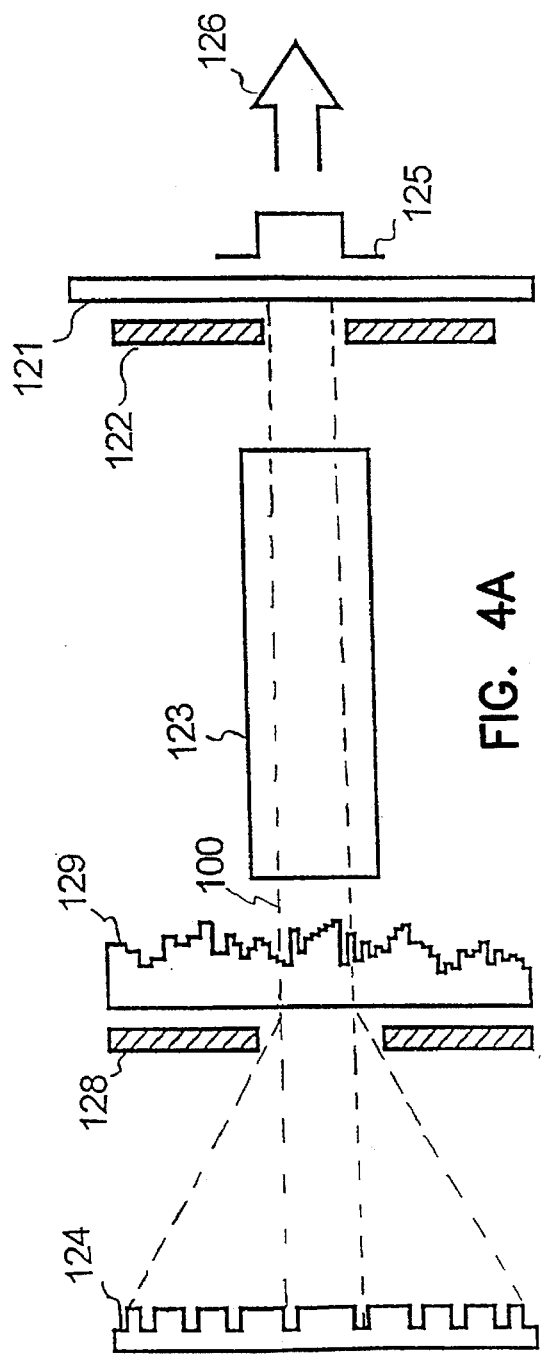
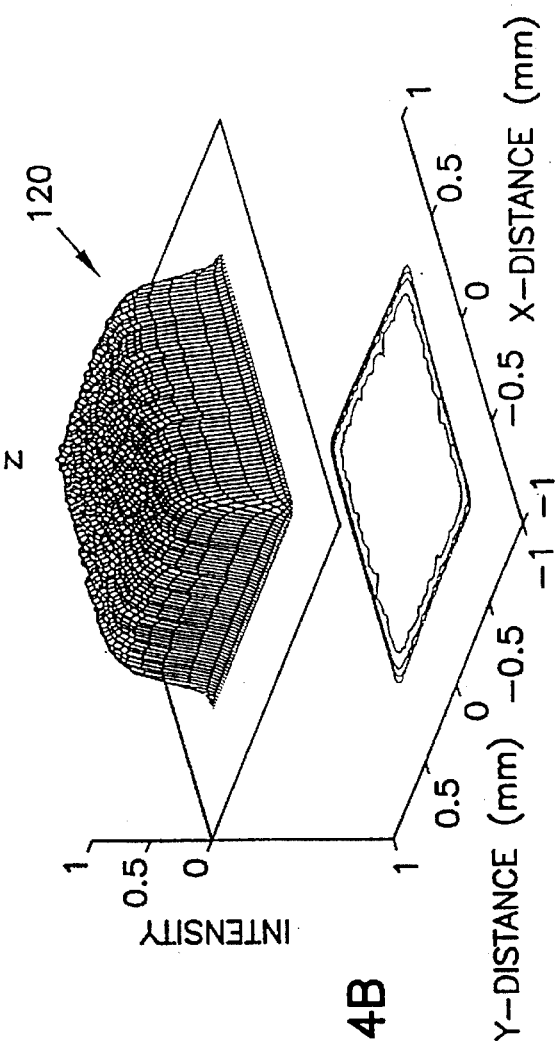
FIG. 4A
FIG. 4B

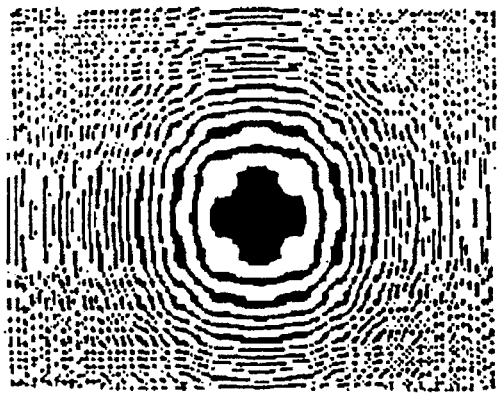
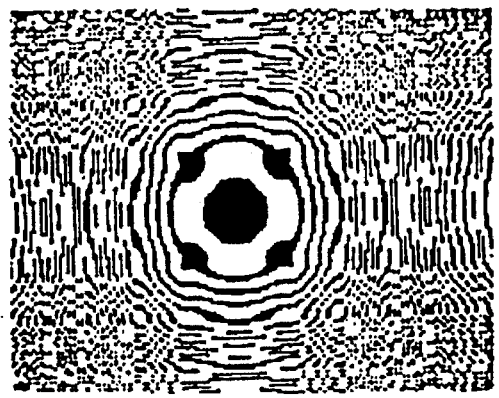
FIG. 10A
FIG. 10B
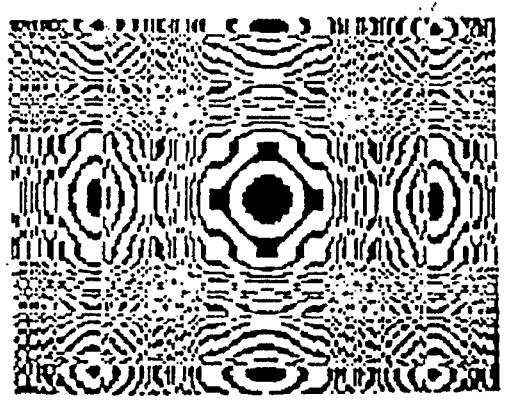
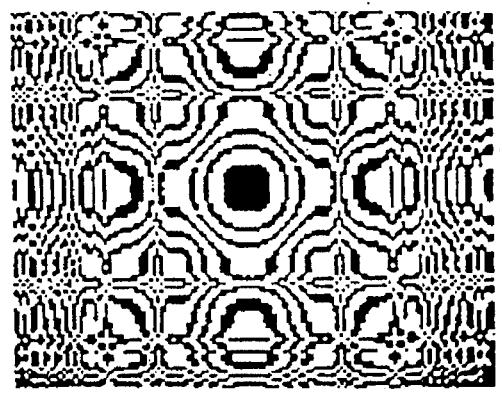
FIG. 10C
FIG. 10D

FGI. 11C

DISTORTION-COMPENSATED PHASE GRATING AND MODE-SELECTING MIRROR FOR A LASER

GOVERNMENT RIGHTS

The invention was made with U.S. Government support under Grant No. NSF/ECS-9109029-01 awarded by the National Science Foundation. The U.S. Government has certain rights in the invention.

FIELD OF THE INVENTION

The present invention relates to lasers and more specifically to laser components and to methods for designing and making laser components which compensate for heat distortion and other distortions or aberrations in the laser system.

BACKGROUND OF THE INVENTION

Conventional laser cavity design techniques contemplate a resonator cavity, shown in FIG. 1, comprising two reflecting elements 110 and 112, surrounding a gain medium 111. The gain medium can be a plasma, a gas, a liquid, or a solid (e.g., a crystal or a semiconductor). The gain medium is excited by a power source.

The term "laser" as used in this discussion is meant to be inclusive of stimulated emission oscillators of electromagnetic radiation of any frequency from radio-frequency (RF) to beyond x-ray frequencies. (RF lasers are sometimes called "masers" by others.) The laser beam will have one or more "modes". A mode in this discussion refers to a "spatial mode", also called a "spatial eigenmode". The mode, a characteristic of the laser beam, is created within a laser cavity and has both a power-distribution profile and a phase-distribution profile. These mode profiles are generally expressed in dimensions transverse to the direction of propagation of the laser beam. A spatial mode is to be distinguished from a "temporal mode", which describes the frequency characteristics of the laser beam. A "fundamental mode" is the spatial mode which has the least loss. Amplitude profile 114 of FIG. 1 illustrates a Gaussian fundamental mode versus transverse beam radius ρ. Amplitude profile 115 of FIG. 1 also illustrates a Gaussian fundamental mode along with a second-order mode shown by curves 116 and 117.

The term "complex" as used in this discussion is mean numbers or functions having real and/or imaginary components.

The term "modal discrimination" describes a function of a laser resonator which can simultaneously provide a small fundamental-mode loss while providing large losses for higher-order modes. The modal discrimination is influenced by the chosen fundamental-mode shape, the length of the cavity, and the placement of aperture stops.

Recently, mode-selecting phase-conjugating mirrors have been used to establish tailored profiles for fundamental modes in $CO_2$ lasers. U.S. Pat. No. 5,255,283 by B élanger teaches a circular mode-selecting phase-conjugating mirror used to establish a radially-tailored circularly-symmetric profile for a fundamental mode in a laser resonator.

The above prior art does not appear to teach how to design or fabricate a custom phase-conjugation mirror (CPCM) which will accommodate a fundamental-mode beam profile of arbitrary profile in Cartesian X and Y transverse dimensions.

SUMMARY OF THE INVENTION

The invention teaches how to design and fabricate a custom distortion-compensating phase-adjustment optical element which will correct for distortions in other optical elements, and in particular, correct for heat distortions in a crystal gain medium for a laser. The invention also teaches how to design and fabricate a custom phase-conjugation mirror (CPCM) which will accommodate a fundamental-mode beam profile of arbitrary profile in Cartesian X and Y transverse dimensions and correct for distortions such as heat. The invention also teaches how to design and fabricate a diffractive mirror for use as a custom phase-conjugation mirror, which is a mirror that will reflect a wavefront having arbitrary (i.e., a complex mode profile that is not necessarily only real but may have imaginary components) field at the mirror surface and correct for distortions such as heat. The invention also teaches using an additional phase element in a laser resonator system having a custom phase-conjugation mirror in order to enhance the phase differential between the fundamental mode and higher-order mode wavefronts over and above the result possible with a single CPCM alone and correct for distortions such as heat. The invention also teaches using a dynamic phase element in a laser resonator system having a custom phase-conjugation mirror in order to (a) compensate for dynamic phase changes in elements in a laser resonator system or (b) introduce temporal variations in the output beam profile or power.

BRIEF DESCRIPTION OF THE DRAWINGS

FIGS. 4A–4B together form FIG. 4 and are a schematic diagram illustrating an embodiment of a custom phase-conjugated diffractive mirror laser resonator with a random phase-adjustment element.

FIG. 10A is a schematic of a plan of the phase shift amounts on the first of four masks for fabricating a custom phase-conjugating diffraction mirror.

FIG. 10B is a schematic of a plan of the phase shift amounts on the second of four masks for fabricating a custom phase-conjugating diffraction mirror.

FIG. 10C is a schematic of a plan of the phase shift amounts on the third of four masks for fabricating a custom phase-conjugating diffraction mirror.

FIG. 10D is a schematic of a plan of the phase shift amounts on the fourth of four masks for fabricating a custom phase-conjugating diffraction mirror.

FIG. 11C is a schematic of a section showing the substrate after etching in the process for fabricating a custom phase-conjugating diffraction mirror.

FIG. 12A is a schematic of a Michelson-type interferometer which can be used to measure aberrations, which can then be corrected for.

FIG. 12B is a schematic of a Michelson-type interferometer which can be used to measure aberrations, which can then be corrected for.

FIG. 12C is a schematic of a Michelson-type interferometer which can be used to measure aberrations, which can then be corrected for.

FIG. 13 is a schematic of a Mach-Zehnder-type interferometer which can be used to measure aberrations, which can then be corrected for.

FIG. 17 is a schematic of an interferometer which can be used to measure aberrations for a laser system in which it is impractical to introduce light beam 921 through one of the mirrors of laser system 940, the aberrations which can then be corrected for.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1A:
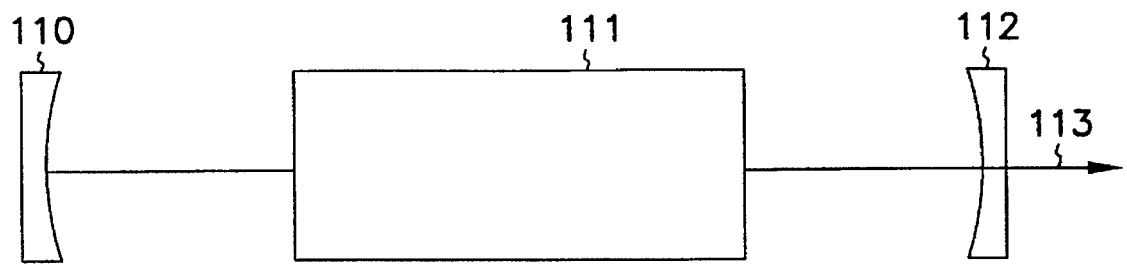
FIGS. 1A–1C together form FIG. 1 and are a schematic diagram illustrating a prior art laser resonator.
Figure 1B:
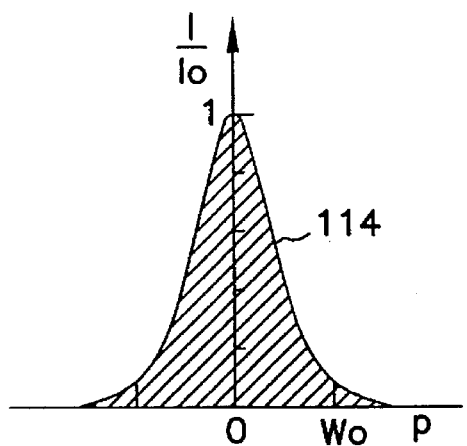
Figure 1C:
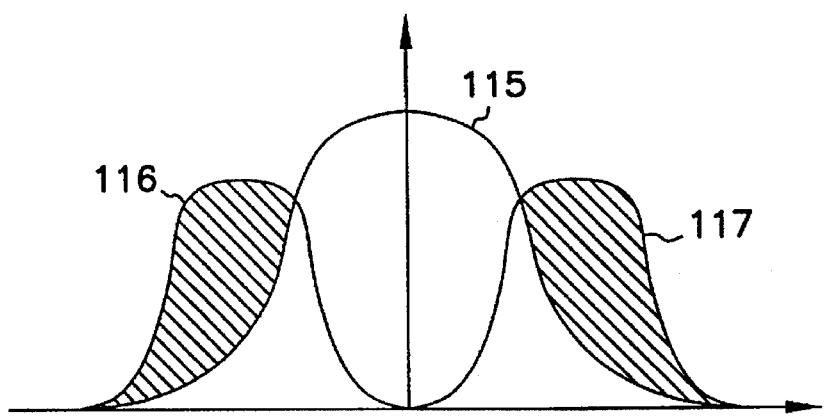
Figure 2A:
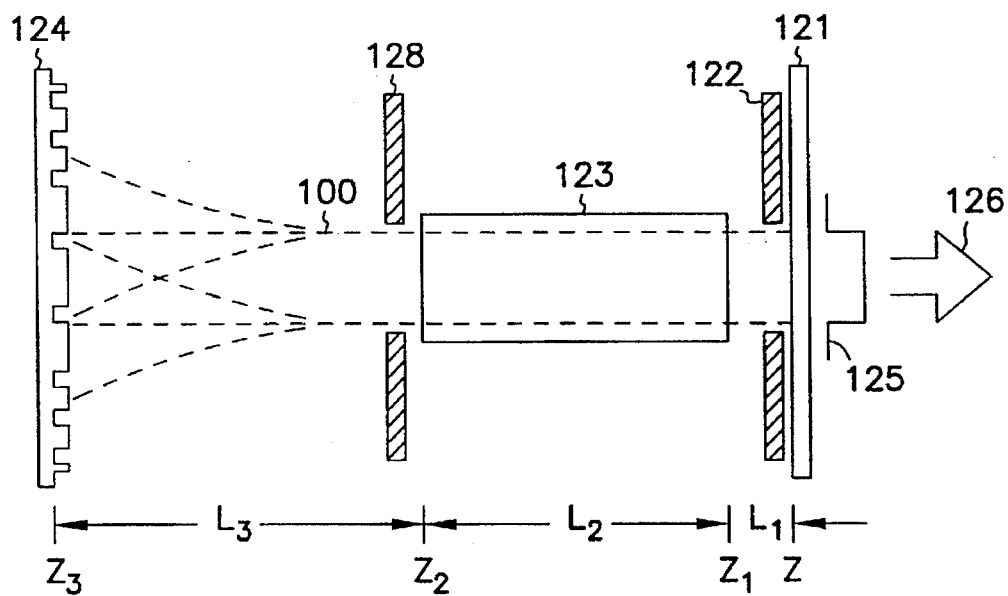
FIGS. 2A–2B together form FIG. 2 and are a schematic diagram illustrating an embodiment of a custom phase-conjugated diffractive mirror laser resonator.
Figure 2B:
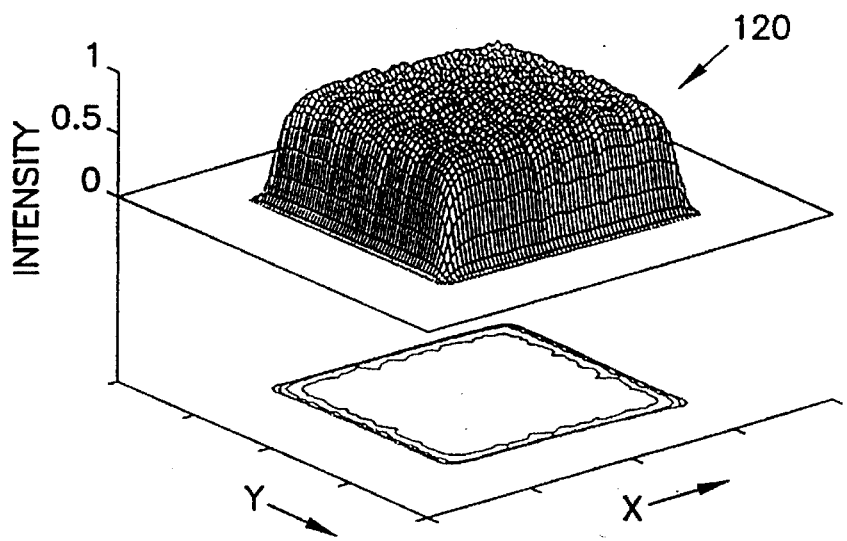

FIG. 2 is a schematic diagram illustrating an embodiment of a custom phase-conjugated diffractive mirror laser resonator. Laser beam 100 oscillates in the cavity formed by output mirror 121, laser gain medium 123, and custom phase-conjugated diffractive mirror 124. Aperture plate 122 and aperture plate 128 help to block higher-order modes. In one embodiment, aperture plate 122 and aperture plate 128 are opaque and have a non-reflective surface. Output laser beam 126 is the laser resonator output. A designer specifies the phase profile and intensity profile for the fundamental mode 125 of laser beam 100 at a point z along the propagation path of laser beam 100. In this embodiment, point z is chosen to be at the reflecting surface of output mirror 121, and thus the phase profile for the fundamental mode 125 is specified to be a wave with phase profile having values of only 0 and $\pi$ radians, corresponding to a flat surface-reflecting mirror for output mirror 121. The intensity profile for the fundamental mode 125 may be specified by the designer to be any arbitrary real positive function (a real function has no imaginary components); e.g., the intensity profile could have an approximately Cartesian square cross section approximated by graph 120 of FIG. 2 and described by the super-Gaussian equation:

$$a(x,y) = \exp(-(x/\omega_0)^{20}) \exp(-(y/\omega_0)^{20})$$

where $\omega_0$ is the transverse beam half-width dimension at the point where intensity drops to $1/e^{40}$ of the maximum intensity along the X or Y axis, and exp() is the exponential function. Embodiments using smaller values (than the 20 power inside the exp() function used in this case) for the exponential power may provide less-sharp edges. Even where such sharp edges are specified, boundary conditions in the laser gain medium and elsewhere in the laser resonator cavity may prevent the fundamental mode from attaining this mode profile.

A laser beam with a intensity profile having an approximately Cartesian square cross section has many uses in industry and research. Uses include integrated circuit photolithography, applications desiring reduced laser hole burning, laser doppler velocimetry, laser radar, optical memories, optical information processing and computing, laser bar-code scanning, projection TV, applications desiring patterns of squares, and laser xerographic printing and facsimile.

While this example uses a constant phase profile at point z, the equation for a(x,y) can incorporate any complex-function electric-field profile (one having both real and imaginary components) as well. The discussion of FIG. 5 below discusses one such embodiment.

The designer then determines the design for the appropriate custom phase-conjugated diffractive mirror by calculating a wavefront of laser beam 100 at the end of each propagation segment of the propagation path starting from point z and ending at the reflecting surface of custom phase-conjugated diffractive mirror 124.

The wavefront of laser beam 100 at point $z_i$, the start of the path though each propagation segment i (where i may take the values 1, 2, 3, . . . n), is characterized by the equation:

$$a_i(x,y) = \int_{-\infty}^{\infty} \int_{-\infty}^{\infty} A_i(u,v) \exp(j 2\pi(xu + vy)) \, du \, dv$$

where j is the square root of $-1$, u and v are spatial frequencies, x is a Cartesian distance in a direction transverse to the direction of propagation, y is a Cartesian distance in a direction transverse to the direction of propagation and orthogonal to x, and $A_i(u,v)$ is the angular wave spectrum of $a_i(x,y)$ at point $z_i$.

The wavefront of laser beam 100 at point $z_{i+1}$, the end of each propagation segment i, is then calculated using the equation:

$$a_{i+1}(x',y') = \int_{-\infty}^{\infty} \int_{-\infty}^{\infty} A_i(u,v) \exp(j2\pi(xu + vy)) \times \exp(j(2\pi L_i/\lambda_i)(sqrt(1 - (\lambda_i u)^2 - (\lambda_i v)^2))) \, du \, dv$$

where $\exp(j(2\pi L_i/\lambda_i))(sart(1-(\lambda_i u)^2-(\lambda_i v)^2)))du\, dv$ where exp () is the exponential function, $\lambda_i$ is the effective wavelength of laser beam 100 within propagation segment i (i.e., $\lambda_i = \lambda_0/n_i$, where $\lambda_0$ is the free space wavelength of laser beam 100 and $n_i$ is the index of refraction of propagation segment i), j is the square root of −1, $L_i$ is length of propagation segment i along the path of propagation, u and v are spatial frequencies, du and dv are integration variables for u and v respectively, sqrt() is the square root function, x is a Cartesian distance in a direction transverse to the direction of propagation, y is a Cartesian distance in a direction transverse to the direction of propagation and orthogonal to x, and $A_i(u,v)$ is the angular wave spectrum of $a_i(x,y)$ at point $z_i$.

This step is recursively applied to each propagation segment starting at point z specified by the designer and ending at the surface of custom phase-conjugated diffractive mirror 124. A mode profile b(x',y') at the reflecting surface of custom phase-conjugated diffractive mirror 124 is defined as the final mode profile $a_{i+1}(x',y')$ for the last propagation segment (ending at the reflecting surface of custom phase-conjugated diffractive mirror 124). A mirror reflectance t(x',y') is then calculated which reflects the complex phase conjugate b*(x',y') of said mode profile b(x',y') at said mirror reflecting surface, using the equation:

$$t(x',y') = b*(x',y')/b(x',y')$$

where b*(x',y') is the complex (having real and imaginary components) phase conjugate of incident mode profile b(x', y').

To illustrate the above-described method, note that FIG. 2 shows three propagation segments. (i takes the values 1, 2, and 3.) The first propagation segment starts at point z, is represented by length $L_1$, has an index of refraction $n_1$ (not shown), and ends at point $z_1$ along the propagation path. The second propagation segment (through laser gain medium 123) starts at point $z_1$, is represented by length $L_2$, has an index of refraction $n_2$ (not shown) equal to the index of refraction of the gain medium, and ends at point $z_2$ along the propagation path. The third propagation segment starts at point $z_2$, is represented by length $L_3$, has an index of refraction $n_3$ (not shown), and ends at point $z_3$ at the reflecting surface of custom phase-conjugated diffractive mirror 124. The above-described method is used to calculate the mode profile $a_1(x',y')$ at point $z_1$; then, using that mode profile as the starting point, the above-described method is used to calculate the mode profile $a_2(x',y')$ at point $z_2$; then, using that mode profile as the starting point, the above-described method is used to calculate the mode profile $a_3(x',y')$ at point $z_3$ which is at the reflecting surface of custom phase-conjugated diffractive mirror 124. Mode profile b(x',y') is defined as the final mode profile $a_3(x',y')$ for the last propagation segment (ending at the reflecting surface of custom phase-conjugated diffractive mirror 124). A mirror reflectance y(x',y') is then calculated which reflects the complex phase conjugate b*(x',y') of said mode profile b(x',y') at said mirror reflecting surface, using the equation:

$$t(x',y') = b*(x',y')/b(x',y')$$

where b*(x',y') is the complex (having real and imaginary components) phase conjugate of incident mode profile b(x', y').

Those skilled in the art would readily understand that lenses and other non-planar optical elements inside the cavity can be incorporated in the calculation by using the appropriate transmittance functions.

The surface elevation of custom phase-conjugated diffractive mirror 124 is then fabricated by known methods (see, e.g., J. R. Leger, M. L. Scott, P. Bundman, and M. P. Griswold, "Astigmatic wavefront correction of a gain-guided laser diode array using anamorphic diffractive microlenses" *Proc, SPIE* {vol. 884}, 82 (1988).) to provide mirror reflectance t(x',y'). One embodiment coats the surface of custom phase-conjugated diffractive mirror 124 with a reflective coating made from a suitable dielectric material using materials and methods known to the art. Another embodiment coats the surface of custom phase-conjugated diffractive mirror 124 with a reflecting coating made from a suitable metallic material using materials and methods known to the art.

In one embodiment, custom phase-conjugated diffractive mirror 124 is fabricated using a series of photolithographic masks, much in the same way as modern integrate circuit are. In other embodiments, custom phase-conjugated diffractive mirror 124 are made from any suitable material (e.g., plastic, resin, or photoresist) such as is used to mass produce compact disks, and arrays of custom phase-conjugated diffraction mirrors can be simulataneously pressed from a single, multiple-image master negative of the desired mirror surface, much in the same way as modern audio compact-disks (CDs) or compact-disk-read-only-memories (CDROMs) are. These custom phase-conjugated diffraction mirrors can thus be mass-produced accurately and inexpensively.

In one embodiment, length $L_1$ is made as small as possible and is assumed negligible, length $L_2$ is made 7.6 cm, and length $L_3$ is made 102.4 cm. $L_3$ is made long enough that the cavity length achieves sufficient modal discrimination; this modal discrimination seems to increase until L reaches a length of one Rayleigh range $z_0$. Optimization studies on super-Gaussian mode shapes have shown that the modal discrimination is maximized when the cavity length is approximately one Rayleigh range of the super-Gaussian. The "Rayleigh range", $z_0$, for a Gaussian distribution is defined by the equation $z_0 = \pi \omega_0^2/\lambda$, where $\omega_0$ is the transverse beam half-width dimension at the point where intensity drops to $1/e^2$ of the maximum intensity (e is the exponential function), and $\lambda$ is the wavelength of the lasing light wave. For this discussion, the Rayleigh range for a beam with super-Gaussian power-profile characteristics is defined using this same formula. For large fundamental-mode beam cross-sections, ($\omega_0 > 0.6$ mm), adequate modal discrimination can require excessively long cavities (greater than one meter, where $\lambda = 1.06$ μm).

The reflected laser beam 100, starting at the reflecting surface of custom phase-conjugated diffractive mirror 124 with mode profile b*(x',y'), then propagates in the reverse direction along the propagation path to point z. At point z, laser beam 100 will then have a mode profile a*(x,y), which is the phase conjugate of the mode profile a(x,y) and traveling in the opposite direction. In this embodiment, a(x,y) is specified as a wave having phase of 0 or π radians at flat mirror 121, and thus flat mirror 121 will reflect the phase conjugate of a*(x,y), which is a(x,y). This then reinforces the original specified mode profile a(x,y) and establishes mode profile a(x,y) as a mode of the cavity. All other modes suffer increased loss from apertures 122 and 128 in conjunction with the operation of custom phase-conjugated diffractive mirror 124, and thus a(x,y) becomes the fundamental mode of the cavity.

Figure 3A:
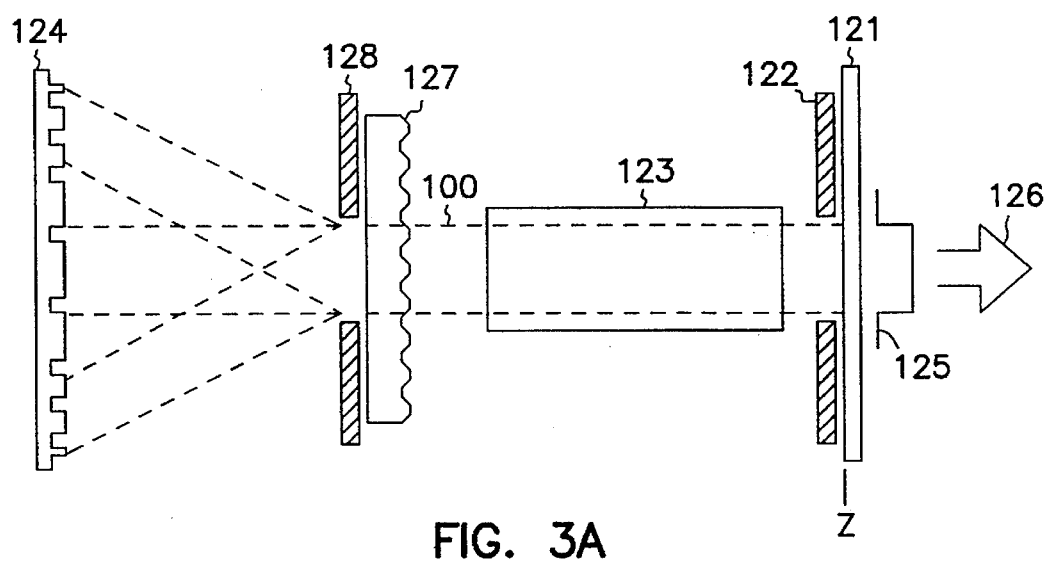
FIGS. 3A–3B together form FIG. 3 and are a schematic diagram illustrating an embodiment of a custom phase-conjugated diffractive mirror laser resonator with a phase-adjustment element.
Figure 3B:
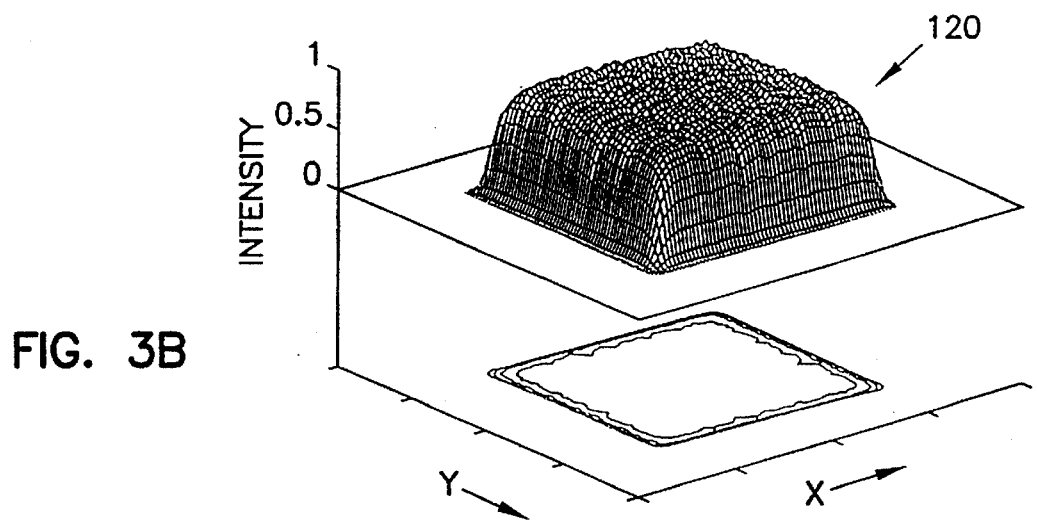

FIG. 3 is a schematic diagram illustrating an embodiment of a custom phase-conjugated mirror laser resonator similar in many respects to FIG. 2, but with a custom phase-adjustment element 127. One purpose of custom phase-adjustment element 127 is to enhance the modal discrimination of the laser resonator system. Another purpose of custom phase-adjustment element 127 is to introduce varying amounts of phase shift into various portions of the transverse cross section of laser beam 100. In this embodiment, custom phase-conjugated mirror 124 may, but need not, be a diffractive mirror.

To design the components of the custom phase-conjugated mirror laser resonator comprising a custom phase-adjustment element, the designer chooses a phase pattern for custom phase-adjustment element 127 to suit the designer's needs.

In one embodiment, illustrated in FIG. 3, custom phase-adjustment element 127 is transparent and is designed to enhance the modal discrimination of the laser resonator system by introducing a phase shift which varies sinusoidally in both Cartesian directions, x and y. In one embodiment with a phase plate having an orthogonal Cartesian sinusoidal grating pattern with a frequency of $f_x=3.8$ mm$^{-1}$ in the x-direction and $f_y=3.8$ mm$^{-1}$ in the y-direction (the phase-adjustment element has a transmittance t(x,y) that approximates $e^{j \cos (2\pi(f_x x + f_y y))}$) and a laser beam wave length of 1.06 μm, the diffractive loss for the second-order mode is increased to 72.9%.

In one embodiment, calculations of the modal discrimination which would be obtained by a number of different sinusoidal phase patterns for custom phase-adjustment element 127 are performed. The sinusoidal phase pattern generating the largest calculated modal discrimination is then used to fabricate custom phase-adjustment element 127.

The method described above for FIG. 2 is recursively applied to each propagation segment starting at point z specified by the designer and ending at custom phase-adjustment element 127. The mode profile $a_{i+1}(x', y')$ at custom phase-adjustment element 127 is then adjusted for the phase shift introduced by custom phase-adjustment element 127. The method described above for FIG. 2 is then recursively applied to each propagation segment starting at custom phase-adjustment element 127 and ending at the surface of custom phase-conjugated mirror 124.

Any custom phase-conjugated mirror can be used for custom phase-conjugated mirror 124, as long as it reflects the complex phase conjugate $b^*(x',y')$ of the mode profile $b(x',y')$ defined at the reflecting surface of the mirror. Thus other laser resonator cavities known to the art could benefit from the addition of a custom phase-adjustment element 127. In this embodiment, a diffractive mirror is used for custom phase-conjugated diffractive mirror 124. As described above for FIG. 2, a mode profile $b(x',y')$ at the reflecting surface of custom phase-conjugated diffractive mirror 124 is defined as the final mode profile $a_{i+1}(x',y')$ for the last propagation segment (ending at the reflecting surface of custom phase-conjugated diffractive mirror 124); however, in this case, this $b(x',y')$ also accounts for the phase shift introduced by custom phase-adjustment element 127. A mirror reflectance t(x', y') is then calculated which reflects the complex phase conjugate $b^*(x',y')$ of said mode profile $b(x',y')$ at said mirror reflecting surface, using the equation:

$$t(x',y')=b^*(x',y')/b(x', y')$$

where $b^*(x',y')$ is the complex (having real and imaginary components) phase conjugate of incident mode profile $b(x', y')$.

In one embodiment, the surface elevation of custom phase-adjustment element 127 is fabricated by known methods (see, e.g., J. R. Leger, M. L. Scott, P. Bundman, and M. P. Griswold, "Astigmatic wavefront correction of a gain-guided laser diode array using anamorphic diffractive microlenses," Proc. SPIE {vol. 884}, 82 (1988).) to provide the desired phase adjustments at that element. The surface elevation of custom phase-conjugated diffractive mirror 124 is also fabricated by similar known methods to provide mirror reflectance t(x',y'). One embodiment then coats the surface of custom phase-conjugated diffractive mirror 124 with a reflective coating made from a suitable dielectric material using materials and methods known to the art. Another embodiment coats the surface of custom phase-conjugated diffractive mirror 124 with a reflective coating made from a suitable metallic material using materials and methods known to the art.

In one embodiment, custom phase-adjustment element 127 is fabricated using a series of photolithographic masks, much in the same way as modern integrated circuits are. In other embodiments, custom phase-adjustment element 127 are made from any suitable material (e.g., plastic, resin, or photoresist) such as is used to mass produce compact disks, and arrays of custom phase-adjustment element can be simultaneously pressed from a single, multiple-image master negative of the desired mirror surface, much in the same way as modern audio compact-disk (CDs) or compact-disk-read-only-memories (CDROMs) are. These custom phase-adjustment elements can thus be mass-produced accurately and inexpensively.

In another embodiment, illustrated in FIG. 4, custom phase-adjustment element 129 is transparent and is designed to enhance the modal discrimination of the laser resonator system by introducing a phase shift which varies in a pseudo-random but known manner in both Cartesian directions, x and y. Other aspects of FIG. 4, and the method used to design components for the embodiment illustrated in FIG. 4, are the same as for FIG. 3. In this embodiment, custom phase-conjugated diffractive mirror 124 compensates for the known and pseudo-random phase shifts introduced to the various portions of the cross section of the mode profile by custom phase-adjustment element 129.

In one embodiment, calculations of the modal discrimination which would be obtained by a number of different random phase patterns for custom phase-adjustment element 129 are performed. In one embodiment, the phase patterns are generated using different "seeds" in a random number generator. The random pattern generating the largest calculated modal discrimination is then used to fabricate custom phase-adjustment element 129.

Figure 5A:
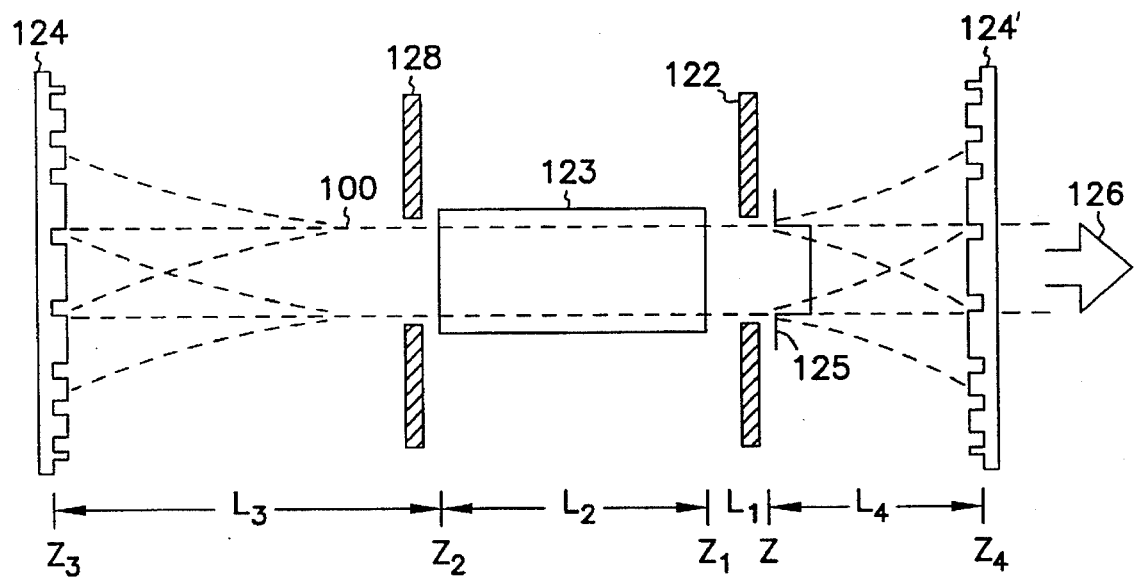
FIGS. 5A–5B together form FIG. 5 and are a schematic diagram illustrating an embodiment of a custom phase-conjugated diffractive mirror laser resonator with two custom phase-conjugated diffractive mirrors.
Figure 5B:
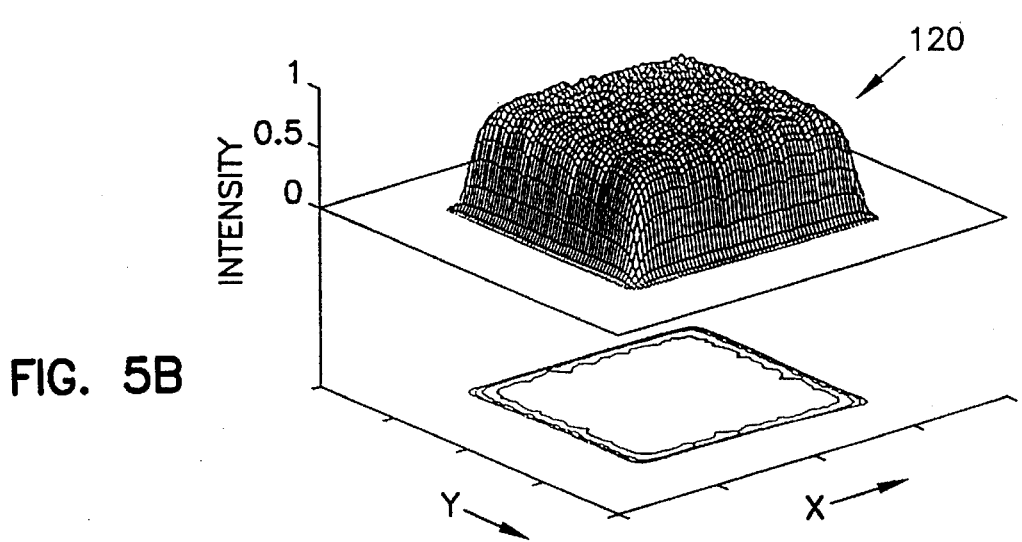

FIG. 5 is a schematic diagram illustrating an embodiment of a custom phase-conjugated diffractive mirror laser resonator with two custom phase-conjugated diffractive mirrors 124 and 124'. One embodiment of this configuration is conceptually similar to an embodiment shown in FIG. 3, with the modification that flat output mirror 121 is combined with custom phase-adjustment element 127 to form custom phase-conjugated diffractive mirror 124'.

The design of one embodiment of this configuration begins in the same manner as for FIG. 2. The method described for FIG. 2 is recursively applied to each propagation segment starting at point z specified by the designer and ending at the surface of custom phase-conjugated diffractive mirror 124. A mode profile b(x',y') at the reflecting surface of custom phase-conjugated diffractive mirror 124 is defined as the final mode profile $a_{i+j}(x',y')$ for the last propagation segment (ending at the reflecting surface of custom phase-conjugated diffractive mirror 124). A mirror reflectance t(x',y') is then calculated with reflects the complex phase conjugate b*(x',y') of said mode profile b(x',y') at said mirror reflecting surface, using the equation:

$$t(x',y')=b*(x',y')/b(x',y')$$

where b*(x',y')is the complex (having real and imaginary components) phase conjugate of incident mode profile b(x', y').

The method described for FIG. 2 is then recursively applied to each propagation segment starting at point z specified by the designer and ending at the surface of custom phase-conjugated diffractive mirror 124'. A mode profile c(x',y') at the reflecting surface of custom phase-conjugated diffractive mirror 124' is defined as the final mode profile $a_{i+j}(x',y')$ for the last propagation segment (ending at the reflecting surface of custom phase-conjugated diffractive mirror 124'). A mirror reflectance t'(x',y') is then calculated which reflects the complex phase conjugate c*(x',y') of said mode profile c(x',y') at said mirror reflecting surface, using the equation:

$$t'(x',y')=c*(x',y')/c(x',y')$$

where c*(x',y') is the complex (having real and imaginary components) phase conjugate of incident mode profile c(x', y').

The surface elevation of custom phase-conjugated diffractive mirror 124 is fabricated by known methods to provide mirror reflectance t(x',y'). One embodiment then coats the surface of custom phase-conjugated diffractive mirror 124 with a reflective coating made from a suitable dielectric material using materials and methods known to the art. Another embodiment coats the surface of custom phase-conjugated diffractive mirror 124 with a reflective coating made from a suitable metallic material using materials and methods known to the art.

The surface elevation of custom phase-conjugated diffractive mirror 124' is fabricated by known methods to provide mirror reflectance t'(x',y'). One embodiment then coats the surface of custom phase-conjugated diffractive mirror 124' with a partially-reflective coating made from a suitable dielectric material using materials and methods known to the art. Another embodiment coats the surface of custom phase-conjugated diffractive mirror 124' with a partially-reflective coating made from a suitable metallic material using materials and methods known to the art. Custom phase-conjugated diffractive mirror 124' thus becomes the output coupler for the laser resonator.

The reflected laser beam 100, starting at the reflecting surface of custom phase-conjugated diffractive mirror 124 with mode profile b*(x',y'), then propagates in the reverse direction along the propagation part to point z. At point z, laxer beam 100 will then have a mode profile a*(x,y), which is the phase conjugate of the mode profile a(x,y) and traveling in the opposite direction. In this embodiment, a*(x,y) continues to propagate until it reaches custom phase-conjugated diffractive mirror 124', where it will have mode profile c(x',y'). This will then reflect from the reflecting surface of custom phase-conjugated diffractive mirror 124' with mode profile c*(x',y'), and will then propagate in the original direction along the propagation path to point z. At point z, laxer beam 100 will now have a mode profile a(x,y). This then reinforces the original specified mode profile a(x,y) and establishes mode profile a(x,y) as a mode of the cavity. All other modes suffer increased loss from apertures 122 and 128 in conjunction with the operation of custom phase-conjugated diffractive mirror 124, and thus a(x,y) becomes the fundamental mode of the cavity.

In one embodiment, calculations of the modal discrimination which would be obtained by a number of various specified phase profiles at various points z for specified mode profile a(x,y) are performed. The specified phase profile generated the largest calculated modal discrimination is then used to fabricate custom phase-conjugated diffractive mirrors 124 and 124'.

In another embodiment, a ring-laser resonator cavity comprising a custom phase-conjugated diffractive mirror 124 is built. In this embodiment, point z is specified at a location that is one-half the propagation distance around the ring from custom phase-conjugated diffractive mirror 124. The mode profiles around the ring are then calculated in a manner as described for FIG. 2, taking into account the phase change introduced at each bending node around the ring. Thus accounted for, the complex mode profile (a mode profile having both real and imaginary components) of the laser beam 100 when it completes the path around the ring wil match the starting mode profile a(x,y).

The laser mode profile can be chosen to have any real positive function of power distribution and arbitrary phase distribution by proper design of the mode-selecting mirrors. In addition, the cavity can be optimized to simultaneously provide a small fundamental mode loss while providing large losses for higher-order modes (a function called "modal descrimination"). The modal discrimination is influenced by the chosen fundamental-mode shape, the length of the cavity, and the placement of aperture stops.

The cavity design of the invention preserves high modal discrimination while allowing use of a shorter cavity length. One embodiment, shown in FIG.3, comprises a flat output mirror 121, a diffractive mode-selecting mirror 124, and a sinusoidal phase grating 127. The designer selects a desired profile for the transverse section of the fundamental mode at the output port, and calculates the Rayleigh-Sommerfeld diffraction pattern of this selected profile at the mode-selecting mirror after passing through the gain medium 123, any other internal optics, and the phase grating. The diffractive profile of the diffractive mode-selecting mirror ("DMSM") 124 is chosen to reflect the phase conjugate of this distribution. The reflected light wave will then retrace its path through the phase grating 127 and form the original selected profile at the output mirror 121 (at point z), thus reinforcing the selected profile and defining it as a mode of the cavity. Higher-order modes are partially blocked by the aperture 128 placed a the phase grating 127 and the aperture 122 placed at the output mirror 121, producing a high loss for those higher-order modes.

A Fox-and-Li analysis (see A. G. Fos and T. Li, *Bell Syst. J.* {40 } 453–488 (1961).) of the above cavity with and without a phase grating 127 was performed and the optimum characteristics of a phase grating with a modulation depth of ±1 radian was studied. Without the grating, a mode-selecting-mirror cavity (with a cavity length of 1 meter) designed for a 20th-order super-Gaussian beam of transverse half-width $\omega_0$=0.6 mm was shown to present a maximum loss to the second-order mode of 48.6% (which is due to the design of the DMSM in conjunction with the apertures). However, when this cavity is reduced in length to 50 cm, the loss to the second-order mode is reduced to only 25.4% (a modal discrimination value which is too small for many high-gain laser designs). There is significant improvement in modal discrimination of this 50-cm-long cavity when a phase grating of spatial frequency f is inserted in the cavity along with a corresponding DMSM. For a phase plate with an orthogonal Cartesian sinusoidal grating pattern with a frequency of $f_x=3.8$ mm$^{-1}$ in the x-direction and $f_y=3.8$ mm$^{-1}$ in the y-direction (the phase-adjustment element has a transmittance t(x,y) that approximates $e^{j\cos(2\pi(f_x x + f_y y))}$), the diffractive loss for the second-order mode is increased to 72.9%. This phase-plate spatial frequency, approximately 4.5 periods across the laser beam transverse cross section, gives the optimal modal discrimination. The maximum modal discrimination occurs when the grating has a phase shift corresponding to a sine function. In all of these examples, the 20th-order super-Gaussian fundamental mode (with square Cartesian beam transverse cross section) is preserved and suffers negligible loss in the cavity.

Figure 6:
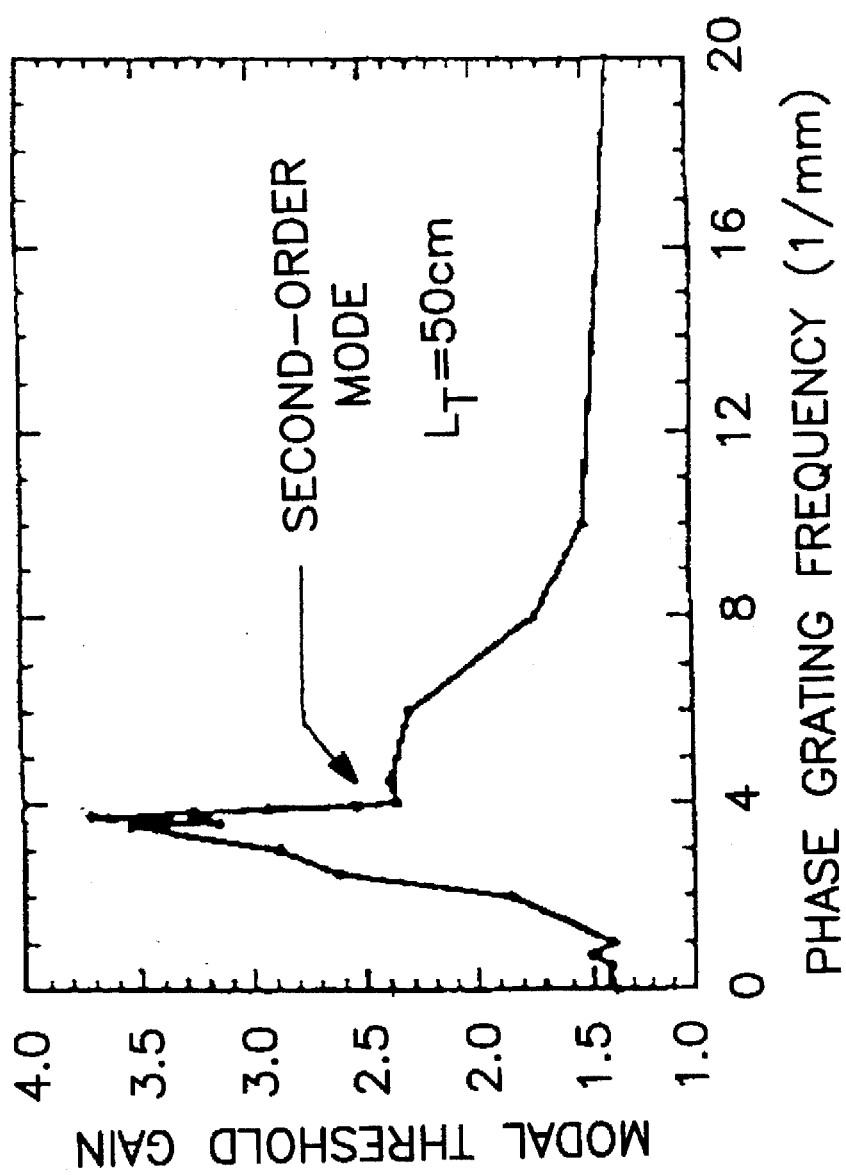
FIG. 6 is a graph of calculated modal threshold gain versus the grating frequency for a sinusoidal Cartesian pattern for a phase-adjustment element.

FIG. 6 is a graph of calculated modal threshold gain versus the grating frequency for a sinusoidal Cartesian pattern for a phase-adjustment element.

Figure 7B:
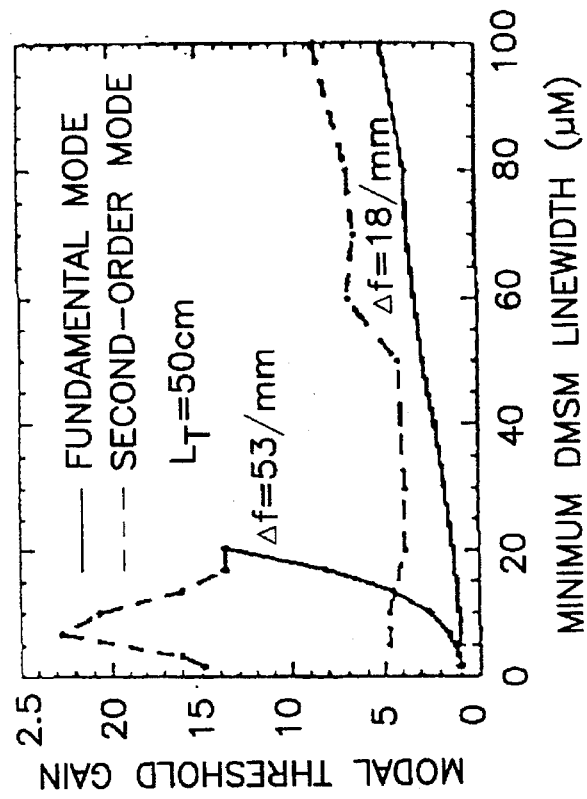
FIG. 7B is a graph of calculated modal threshold gain versus the minimum DMSM line- width a random Cartesian pattern for a phase-adjustment element.
Figure 7A:
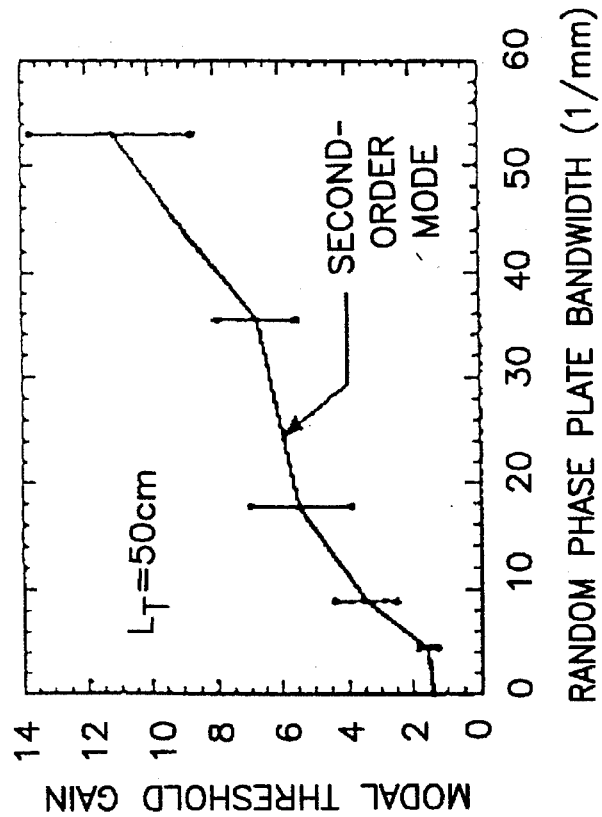
FIG. 7A is a graph of calculated modal threshold gain versus the grating frequency bandwidth for a random Cartesian pattern for a phase-adjustment element.

FIG. 7a) is a graph of calculated modal threshold gain versus the grating frequency bandwidth for a random Cartesian pattern for a phase-adjustment element.

FIG. 7b)is a graph of calculated modal threshold gain versus the minimum DMSM line- width a random Cartesian pattern for a phase-adjustment element.

Figure 8:
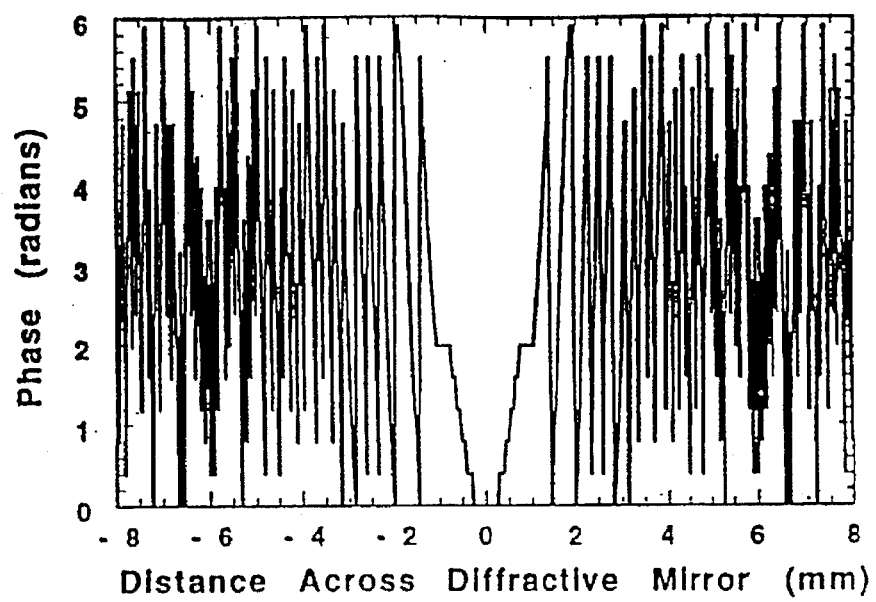
FIG. 8 is a graph of a cross section of a phase profile showing phase shift amounts on a custom phase-conjugating diffraction mirror.

FIG. 8 is a graph of a cross section of the phase shift amounts on a custom phase-conjugating diffraction mirror.

Figure 9:
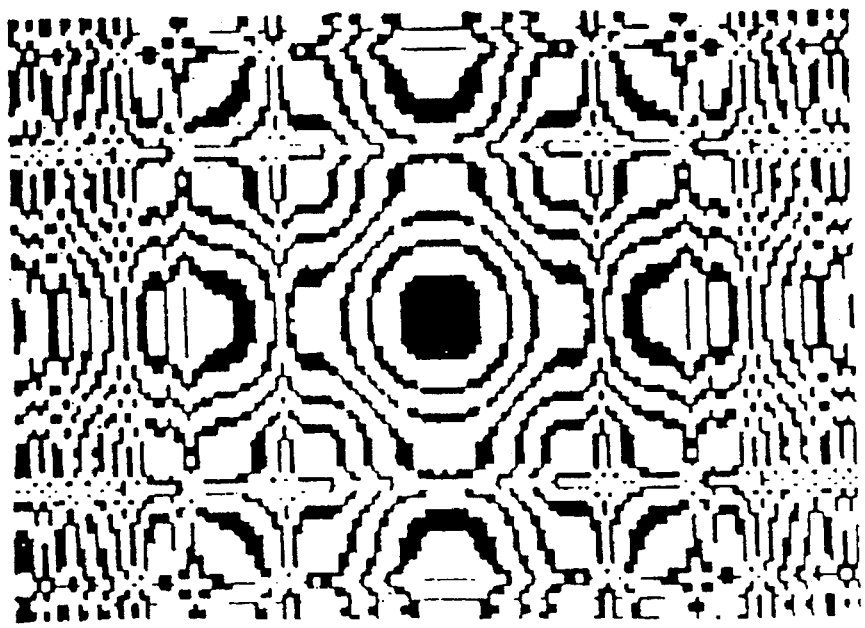
FIG. 9 is a schematic of a plan of the phase shift amounts on one mask for an E-beam pattern for fabricating a custom phase-conjugating diffraction mirror.

FIG. 9 is a schematic of a plan of the phase shift amounts on one mask for fabricating a custom phase-conjugating diffraction mirror.

FIG. 10A is a schematic of a plan of the phase shift amounts on the first of four masks for fabricating a custom phase-conjugating diffraction mirror. FIG. 10B is a schematic of a plan of the phase shift amounts on the second of four masks for fabricating a custom-conjugating diffraction mirror. FIG. 10C is a schematic of a plan of the phase shift amounts on the third of four masks for fabricating a custom phase-conjugating diffraction mirror. FIG. 10D is a schematic of a plan of the phase shift amounts on the fourth of four masks for fabricating a custom phase-conjugating diffraction mirror. These four figures show schematic of a plan of the phase shift amounts on four masks for fabricating a custom phase-conjugating diffraction mirror.

Figure 11A:
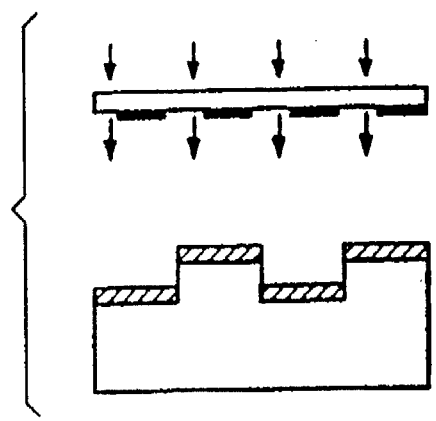
FIG. 11A is a schematic of a section showing the second e-beam mask and a sensitized 2-level substrate in the process for fabricating a custom phase-conjugating diffraction mirror.
Figure 11B:
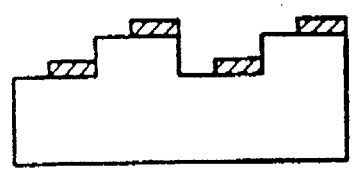
FIG. 11B is a schematic of a section showing the substrate after developing the resist in the process for fabricating a custom phase-conjugating diffraction mirror.
Figure 11D:
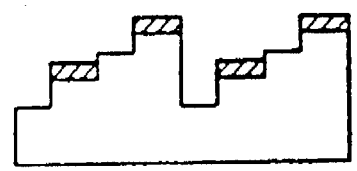
FIG. 11D is a schematic of a section showing the 4-level result substrate in the process for fabricating a custom phase-conjugating diffraction mirror.
Figure 11D:
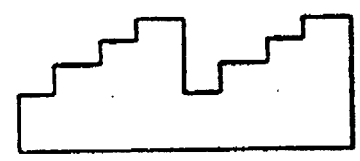

FIGS. 11A–11D form a schematic of a section showing the process for fabricating a custom phase-conjugating diffraction mirror. FIG. 11A is a schematic of a section showing the second e-beam mask and a sensitized 2-level substrate in the process for fabricating a custom phase-conjugating diffraction mirror. FIG. 11B is a schematic of a section showing the substrate after developing the resist in the process for fabricating a custom phase-conjugating diffraction mirror. FIG. 11C is a schematic of a section showing the substrate after etching in the process for fabricating a custom phase-conjugating diffraction mirror. FIG. 11D is a schematic of a section showing the 4-level result substrate in the process for fabricating a custom phase-conjugating diffraction mirror.

Some applications, such as short-pulse Q-switching, require a large mode cross-section and short cavity length. The same cavity design was studied with a total length of 10 cm (corresponding to 1/10 Rayleigh range). Using a phase plate having a grating with a spatial frequency of 10.5 mm$^{-1}$, the cavity loss for the second-order made is 58.3%. This large modal discrimination is significantly greater than a simple DMSM cavity without a phase plate with a length of one full Rayleigh range (in this case, approximately 1 meter).

The addition of a phase plate in a mode-selecting-mirror laser cavity permits both a reduction in the required cavity length and an increase in modal discrimination.

Phase-Adjusting Elements

The vast majority of commercial lasers utilize a stable Fabry-Perot resonator to establish the laser mode. Although the Fabry-Perot resonator design produces a low-loss fundamental mode, it has several inherent disadvantages. First, the losses to the higher-order spatial modes are also fairly low, making it difficult to insure operation in a single spatial mode. In addition, the transverse dimensions of the fundamental mode laser beam are usually small, reducing the amount of power that can be extracted from the gain medium. Increasing the transverse dimensions of the fundamental-mode laser beam reduces the modal discrimination between the fundamental mode and the higher-order modes to an unacceptable level. Finally, using a Gaussian profile for the fundamental mode may not be ideal for applications that require uniform illumination.

Unstable resonators can support transverse dimensions of the fundamental-mode laser beam while simultaneously preserving adequate higher-order mode discrimination. However, these resonators have inherently "lossy" fundamental modes, and are not suitable for low-gain laser systems. In addition, they often have an obstructed output aperture that produces an undersirable near-field pattern (the power-distribution profile as measured near the output port of the laser cavity).

Recently, a variety of laser cavities have been demonstrated that use more sophisticated optics to tailor the fundamental-mode shape and increase the modal discrimination between adjacent spatial modes. These include variable-reflectivity mirrors, circular graded phase mirrors, and diffractive mode-selecting mirrors. The last two methods allow the desinger to tailor the mode profile to any desired shape (although Bélanger's beam has only circular symmetry), and have been used to generate super-Gaussian fundamental modes with exceedingly flat tops. However, large modal discrimination between spatial modes seem to occur when the cavity length is approximately one Rayleigh range of the super-Gaussian, Thus, for laser beams with larger transverse dimensions, these methods can result in very large cavity lengths, thus compromising mechanical stability and increasing the pulse length for Q-switched operation.

A variation of the diffraction mode-selecting mirror cavity is described that significantly increases the modal discrimination while reducing the required cavity length. The cavity, shown in FIG. 3, contains a diffractive mode-selecting mirror 124 on one end and a flat mirror 121 on the other end. A transparent phase plate 127 is placed between these two mirrors to (a) increase the modal discrimination, (b) increase the output power, (c) decrease the cavity length, and (d) increase the allowed diameter of the laser beam mode. The maximum feature size on the DMSM, however, must be made smaller to compensate for the higher spatial frequencies on the phase front at the mirror due to the phase plate.

The design of the cavity proceeds in much the same way as the simple diffractive mode-selecting mirror. The designer first chooses the desired amplitude and/or phase profile of the fundamental mode at any convenient longitudinal location, (e.g., one such location is at the flat output mirror 121, where the complex light field is everywhere real). The resulting field of the selected profile propagated through the gain medium 123 (and any other internal optics) to the phase plate is calculated by the Rayleigh-Sommerfeld diffraction formula, $$a_{i+1}(x',y') = \int_{-\infty}^{\infty}\int_{-\infty}^{\infty} A_i(u,v)\exp(j2\pi(xu+vy)) \times$$
$$\exp(j(2\pi L_i/\lambda_i)(sqrt(1-(\lambda_i u)^2 - (\lambda_i v)^2)))\,du\,dv$$

where exp() is the exponential function, $\lambda_i$ is the effective wavelength of laser beam 100 within propagation segment i (i.e., $\lambda_i = \lambda_0/n_i$, where $\lambda_0$ is the free space wavelength of laser beam 100 and $n_i$ is the index of refraction of propagation segment i), j is the square root of $-1$, $L_i$ is length of propagation segment i along the path of propagation, u and v are spatial frequencies, du and dv are integration variables for u and v respectively, sqrt() is the square root function, x is a Cartesian distance in a direction transverse to the direction of propagation, y is a Cartesian distance in a direction transverse to the direction of propagation and orthogonal to x, and $A_i(u,v)$ is the angular wave spectrum of $a_i(x,y)$ at point $z_i$, multiplied by the phase transmittance of the plate $e^{(j\phi(x,y))}$, and then propagated the remaining distance to the diffractive mode-selecting mirror.

The reflectance of the diffractive mode-selecting mirror is then chosen to return the phase conjugate of this calculated distribution. The diffractive mode-selecting mirror 124 with the chosen reflectance is fabricated using known methods; see, e.g., J. R. Leger, M. L. Scott, P. Bundman, and M. P. Griswold, "Astigmatic wavefront correction of a gain-guided laser diode array using anamorphic diffractive microlenses," *Proc. SPIE* {vol. 884}, 82 (1988). The phase-conjugate wave will propagate back through the phase plate 127 and gain medium 123 (and any other internal optics) to the output mirror 121, regenerating the designer-selected original distribution and establishing it as a mode of the cavity. If the size of the mode-selecting mirror 124 is made sufficiently large and the two aperture sizes $d_1$ and $d_2$ for apertures 122 and 128 are chosen properly, the loss to this mode can be made very small and it becomes the fundamental cavity mode. The higher-order cavity modes are then calculated by solving the integral equation $$\int K(\overline{\chi},\overline{\chi}')U_\nu(\overline{\chi}')d^2\overline{\chi}' = \gamma_\nu U_\nu(\overline{\chi})$$

where the integral kernel $K(\overline{\chi},\overline{\chi}')$ describes the round trip propagation in the cavity, $U_\nu(\overline{\chi})$ are the eigenfunctions of the equation, and $\gamma_\nu$ their corresponding eigenvalues. One embodiment designs a phase plate with a phase function $\exp(j\phi(x,y))$ that provides the maximum amount of loss to the second-order mode for a given cavity length.

Referring to FIG. 3, modeling experiments were performed using a laser cavity with element spacing $L_2=20$ cm and $L_3=30$ cm, resulting in a total cavity length $L_T=50$ cm. The fundamental mode was chosen to be a 20th-order super-Gaussian of square cross-section and beam transverse dimension of 1.2 mm in both the x and y dimensions. The output aperture 122 has size $d_1=1.3$ mm, resulting in negligible clipping of the super-Gaussian. The phase-plate aperture 128 has $d_2$ chosen to be 4 mm to pass the diffracted super-Gaussian beam with negligible clipping. The diffractive mode-selecting mirror 124 was assumed to be arbitrarily large.

The first phase plate 127 studied was a simple phase grating with $\phi(x,y)=m\sin(2\pi f_g x)$, where m is the modulation index and $f_g$ is the phase plate grating frequency. The loss to the fundamental mode in this case was always less than 0.1%. FIG. 6 shows the laser threshold gain $g_{th}$ required for the second-order mode to overcome the cavity diffractive loss. $g_{th}$ is related to the cavity loss l by $g_{th}=1/(1-l)$, so that a threshold gain of unity corresponds to a "lossless" cavity.

Threshold gains were calculated for a phase plate grating 127 with m=1 and a variety of frequency values $f_g$. A grating frequency $f_g=0$ corresponds to a simple diffractive mode-selecting mirror cavity, and has a threshold gain $g_{th}=1/(1-l)=1.4$ (or a loss l=28%). This value can be improved markedly by increasing the grating frequency to approximately 4 cycles/mm, where $g_{th}=1/(1-l)=3.7$ (corresponding to a loss of 73%). Increasing the frequency past this point decreases the modal discrimination. This is expected, since for a sufficiently high frequency, the different orders of the grating do not overlap. The diffractive mode-selecting mirror then simply consists of copies of the simple mode-selecting mirror at each of the diffraction orders. The effects of grating translation and modulation depth were also studied. Modal threshold gains as large as $g_{th}=1/(1-l)=6.9$ were observed for phase modulation depths m=11 radians.

It was postulated that the degree of modal discrimination was related to the angular plane wave spectrum incident on the mode-selecting mirror. To test this, a series of experiments was performed using random phase plates with different angular plane wave spectra. Each phase plate was designed to have an approximately Gaussian angular plane wave spectrum with the power spectral bandwidth defined as the $1/e^2$ point of the Gaussian. FIG. 7a shows the increase of threshold gain to the second-order mode with increasing phase plate bandwidth. These results are from using a phase plate with random phases. FIG. 7a) shows laser gain required to overcome diffractive losses to the second-order mode as a function of the spatial-frequency bandwidth of the phase plate. FIG. 7b) shows the effect of finite diffractive mode-selecting mirror linewidth on the threshold gain of the fundamental and second-order modes for two different bandwidths $\Delta f$.

The error bars show the statistical variation in the simulation. Very high modal discrimination can be obtained by presenting the diffractive mode-selecting mirror with a sufficiently intricate light field. The price paid for this increased modal discrimination is an increase in intricacy of the mode-selecting mirror. FIG. 7b shows the effect of mode-selecting mirror linewidth quantization on the modal gains of the fundamental and second-order mode. For fundamental-mode losses of approximately 0.1%, features as large as 5 μm can be used for the low-bandwidth phase mask (18 mm$^{-1}$), whereas 1.7 μm features are required for a high-bandwidth phase mask (53 mm$^{-1}$).

Finally, an embodiment implemented a very short ($L_T=10$ cm) laser cavity containing a random phase plate with a bandwidth of 44 mm$^{-1}$. The phase mask was placed in the center of the cavity as in FIG. 4 ($L_2=5$ cm, $L_3=5$ cm), and a 20th-order super-Gaussian chosen as the fundamental-mode profile. A mode-selecting mirror was designed with a minimum feature size of 2 μm and 16 phase quantization levels. The resulting fundamental cavity mode profile is shown in FIG. 4 at graph 120, for a 1.2-mm beam size. Graph 120 shows the theoretical two-dimensional fundamental-mode intensity profile of a 10-cm laser cavity containing a random phase plate.

The finite linewidth and phase quantization of the mode-selecting mirror produce small non-uniformities in the beam profile and result in a fundamental-mode loss of approximately 1.3%. The gain required to overcome the losses to the second-order mode was 5.1 (corresponding to a loss of greater than 80%). For comparison, a stable Fabry-Perot cavity with the same cavity length, beam size, and fundamental mode loss has a second-order modal gain of only 1.08, corresponding to a loss of just 7.2%.

If a modal gain of 2.0 is sufficient to discriminate against the second-order mode (corresponding to a loss of 50%), beam diameters of up to 4.5 mm can be used in this 10-cm-long cavity. It is therefore possible to extract a large amount of power from the gain medium, while still maintaining a very small cavity length.

In conclusion, a new type of laser resonator was implemented that employs an intra-cavity phase plate and a diffractive mode-selecting mirror to produce large-diameter fundamental modes in a short cavity. The intensity profile of the fundamental mode can be chosen to suit the application, and the loss to higher-order modes designed to effectively insure single-spatial-mode operation.

A Laser Using Two Custom Phase-Conjugated Diffractive Mirrors

A diffractive laser cavity mirror is described in the discussion for FIG. 2 and FIG. 5 that can tailor the laser mode profile in amplitude and phase. An embodiment of this diffractive element is shown in FIG. 2 for a square, flat-top fundamental mode. The mirror had a theoretical fundamental mode loss of only 0.001 and a second-order mode loss of 0.57, resulting in high modal discrimination. The fabricated mirror was tested in a Nd:YAG laser system. The resulting square flat-top mode had an RMS flatness of 1.5% of maximum and a large discrimination against higher-order modes.

Conventional spherical mirrors are used in virtually all modern laser resonators. Although the resulting Gaussian mode shape is sometimes desirable; there are many applications where a different shape may be more appropriate. In addition, the modal discrimination of adjacent transverse modes is often small, and it is desirable to maximize this modal discrimination while maintaining a large mode volume. Amplitude spatial filtering has been used to produce flat-top laser mode profiles, see V. Kermene, A. Saviot, M. Vampouille, B. Colombeau, C. Froehly, and T. Dohnalik, "Flattening of the spatial laser beam profile with low losses and minimal beam divergence," Opt. Lett.{17}, 859 (1992). More intricate mirror shapes have been used to tailor the modal profile of diode laser arrays and $CO_2$ lasers. The invention extends this latter technique using diffractive optical elements to tailor the fundamental mode of a Nd:YAG laser. In addition, careful choice of cavity length and modal filters can provide large modal discrimination.

The laser cavity shown in FIG. 5 consists of two diffractive mode-selecting mirrors spaced by a distance $L_T$, the sum of all $L_i$ for each propagation segment in the propagation path.

The design of the diffractive mirrors is chosen to establish the desired mode as the fundamental mode of the resonator system. Let the desired amplitude and phase of the mode just to the left of z be described by $a_i(x,y)$, where $a_i(x,y)$ is a complex function. This can be expressed equivalently in terms of its angular plane wave spectrum $A_i(u,v)$ as $$a_i(x,y) = \int_{-\infty}^{\infty} \int_{-\infty}^{\infty} A_i(u,v) \exp(j2\pi(xu+vy))\, du\, dv$$

where j is the square root of $-1$, u and v are spatial frequencies, x is a Cartesian distance in a direction transverse to the direction of propagation, y is a Cartesian distance in a direction transverse to the direction of propagation and orthogonal to x, and $A_i(u,v)$ is the angular wave spectrum of $a_i(x,y)$ at point $z_i$.

The wavefront of laser beam 100 at point $z_{i+1}$, the end of a propagation segment i, is then calculated using the equation:

$$a_{i+1}(x',y') = \int_{-\infty}^{\infty} \int_{-\infty}^{\infty} A_i(u,v) \exp(j2\pi(xu+vy)) \times$$

$$\exp(j(2\pi L_i/\lambda_i)(sqrt(1 - (\lambda_i u)^2 - (\lambda_i v)^2)))\, du\, dv$$

where exp() is the exponential function, $\lambda_i$ is the effective wavelength of laser beam 100 within propagation segment i ($\lambda_i = \lambda_0/n_i$, where $\lambda_0$ is the free space wavelength of laser beam 100 and $n_i$ is the index of refraction of propagation segment i), j is the square root of $-1$, $L_i$ is length of propagation segment i along the path of propagation, u and v are spatial frequencies, du and dv are integration variables for u and v respectively, sqrt() is the square root function, x is a Cartesian distance in a direction transverse to the direction of propagation, y is a Cartesian distance in a direction transverse to the direction of propagation and orthogonal to x, and $A_i(u,v)$ is the angular wave spectrum of $a_i(x,y)$ at point $z_i$.

The distribution at the reflecting surface of mirror 124 is given by recursive application of the above equations for the propagation path.

If the mirror 124 is constructed with a reflectance $t_2(x', y')$ of $$t_2(x',y') = \{b^*(x',y')\}/\{b(x',y')\},$$

where * indicates the complex conjugate, the return wave is given by $$b(x',y')t_2(x',y') =$$

$$b^*(x',y') = \int_{-\infty}^{\infty} \int_{-\infty}^{\infty} A^*(u,v)\exp[-j2\pi(xu+yv)]$$

$$\exp[-jkl\sqrt{1-(\lambda u)^2-(\lambda v)^2}\,]\, du\, dv.$$

Propagation back to z results in $$\int_{-\infty}^{\infty} \int_{-\infty}^{\infty} A^*(u,v)\exp[-j2\pi(xu+yv)]\, du\, dv = c^*(x,y)$$

If now the mirror reflectance of 124' is chosen to be $$t_1(x,y) = \{c(x,y)\}/\{c^*(x,y)\},$$

the original distribution a(x,y) has reproduced itself after one round-trip in the laser cavity, thereby establishing itself as a mode of the system.

Since the reflectances of the two mode-selecting mirrors are phase-only, they can be easily fabricated as diffractive optical elements. By making these elements sufficiently large, diffractive losses can be kept to a minimum and the loss to the fundamental mode can be very small. This phase-conjugate cavity is reminiscent of resonators based on Brillouin scattering or four-wave mixing, see J. Auyeung, D. Fekete, A. Yariv, and D. M. Pepper, IEEE J. Quantum Electron.{QE-15}, 1180 (1979). Note, however, that the mode-selecting mirror phases are fixed, so this low-loss imaging only occurs for the desired fundamental mode. The diffractive mirror can be designed to be "lossy" to higher-order modes, making it an effective filter for fundamental-mode operation.

Because diffractive mirrors can be fabricated for virtually any phase profile, the geometric shape of the mode as well as its amplitude and phase profile are entirely arbitrary. To demonstrate the flexibility of this technique, a square-shaped mode with approximately uniform amplitude and phase a(x,y) given by a super-Gaussian of order 20 was generated:

$$a(x,y)=\exp(-(x/\omega_0)^{20})\exp(-(y/\omega_0)^{20})$$

where $\omega_0$ is 0.6 mm, and is the transverse beam half-width dimension at the point where power drops to $1/e^{40}$ of the maximum power, exp() is the exponential function. It is apparent that mirror 124' of FIG. 5 can be replaced by a plane mirror 121 of FIG. 2, and only a single element needs to be fabricated. The phase of mirror 124 is calculated by using the above method for the chosen cavity length, see J. R. Leger and G. J. Swanson, "Optical device for laser coupling and coherent beam combining," U.S. Pat. No. 5,033,060 (1991) and J. R. Leger and X. Li, "Modal properties of an external diode-laser-array cavity with phase conjugate optics," *Bulletin of the American Physical Society*{37}, 1212 (1992). A diffractive optical element is then produced by performing a "modulo-$2\pi$" operation on the phase function and quantizing the result into sixteen levels. The phase profile of the diffractive element is shown in FIG. 8.

A diagram of a Nd:YAG laser cavity is shown in FIG. 2.

The laser cavity consists of a partially-reflecting flat output mirror 121, a 100%-reflecting mode-selecting mirror 124, and a flashlamp-pumped Nd:YAG laser medium 123. Both mirrors have adjustable apertures 122 and 128 to control their size. A Fox-and-Li analysis of the laser modes was performed to study the effect of the mirror phase quantization, laser cavity length, and mirror aperture sizes on the mode shape and mode loss. Initial designs of the mode-selecting mirror using four and eight phase-quantization levels resulted in fundamental modes with excessive ripple in the flat-top region. The theoretical mode produced by a sixteen-level element was very close to the ideal 20th-order super-Gaussian, with sharp sidewalls and an RMS ripple of less than 1.5% in the flat-top region. The minimum line width for this 16-level approximation is 50 µm, making fabrication quite straightforward. Since the smallest features at the edge of the phase function in FIG. 8 are 150 µm, this 50 µm sampling is more than adequate.

The cavity length and mode-selecting mirror size were then optimized by calculating the modal loss for the two lowest-order modes as a function of mirror separation and diffractive mirror size. (See, e.g., J. R. Leger, D. Chem, and Z. Wang, *Opt. Lett.* {19}, 108–110 (1994).)

For each mirror spacing, a new mode-selecting mirror was calculated to produce the same desired fundamental mode. The round-trip intensity loss of the two-dimensional mode was determined by calculating the eigenvalue of a specific one-dimensional mode $\gamma_\nu$, and using: loss=$1-\gamma_\nu^4$.

For mode-selecting mirror sizes greater than approximately 4 mm, the loss to the lowest-order mode is negligible (<0.0001). The loss to the next lowest-order mode is seen to peak at a distance $Z_0$, where as above, Rayleigh range $$L_r=\pi\omega_0^2/\lambda$$

is the Rayleigh range of a conventional Gaussian beam. For the experiment that was conducted, $\omega_0$=0.6 mm, $\gamma$=1.06 µm, and $L_r$=1.07 meters. When the increased index of the YAG crystal in part of the cavity (index of refraction n=1.8 over 10 cm) is accounted for, the resultant cavity length is 1.10 meters.

From experiments (see J. R. Leger, D. Chen, and Z. Wang, *Opt. Lett.*{19}, 108–110 (1994).), it is apparent that the maximum modal discrimination is achieved for small mode-selecting mirrors. However, small mirror sizes tend to produce a mode with less steep sidewalls. This is to be expected, since the higher harmonics from the square-mode diffraction are clipped by the mirror. In one embodiment, a mode-selecting mirror size of 8 mm was therefore chosen as a compromise between modal discrimination and desired mode shape.

The finite output mirror has very little effect on the shape or loss of the fundamental mode for mirror sizes greater than 1.2 mm, as expected. The loss to the second-order mode is significant and increases with a reduced output mirror size. For the 1.2-mm mirror used in the case study, the fundamental mode loss is 0.001 and the second-order mode loss is 0.57. This substantial loss difference makes it possible to pump the laser hard while still maintaining single-spatial-mode operation.

The mode-selecting mirror was fabricated by a four-step mask-and-etch process, see J. R. Leger, M. L. Scott, P. Bundman, and M. P. Griswold, "Astigmatic wavefront correction of a gain-guided laser diode array using anamorphic diffractive microlenses," *Proc. SPIE* {vol. 884}, 82 (1988). This procedure resulted in a 16-level phase element with a profile that approximated the phase. FIG. 9 shows one of the four e-beam masks fabricated to produce the element. Since the smallest features on any of the masks were only 50 µm in size, wet chemical etching was used. This gave a very controllable etch rate and produced an optically smooth surface.

The performance of the diffractive mode-selecting mirror was studied first outside the laser cavity. A highly expanded continuous-wave ("cw") Nd:YAG laser was used to illuminate a 1.2 mm by 1.2 mm square aperture with a uniform plane wave. The mode-selecting mirror was place 1.10 meters behind this aperture, and the reflected wave studied after propagation back to the square aperture. The mirror produced a very well-defined square shape. The modal reflectivity was measured by comparing the power in this square image (integrated over a slightly larger square area of 1.3 mm by 1.3 mm) to the incident power. After compensating for the imperfect reflectivity of the gold coating, the modal reflectivity was measured to be 98% to 99%.

The performance of the mode-selecting mirror inside a laser cavity was studied and tested next. The laser cavity was set up as in FIG. 2 with a pulsed single-tube flash lamp pumping the YAG rod. The pulse rate was kept below 2 Hz to reduce thermal effects on the laser rod; interferometric measurements of the rod by a HeNe probe beam showed these thermal aberrations to be negligible.

The shape of the mode intensity was measured by a linear CCD camera and frame grabber. It was discovered experimentally that slightly better mode shapes were produced using output apertures 122 having aperture sizes between 1.7 mm and 2.0 mm. An embodiment used an output aperture 122 of 2.0 mm, and a corresponding mode-selecting mirror aperture 128 of 16 mm. The RMS flatness across the top of the measured beam is 1.5% of the peak value.

The square shape of the mode schematically represented in graph 120 of FIG. 2 was virtually unaffected by the shape of the apertures, even when circular- and diamond-shaped apertures were used. Some degradation of the sidewall steepness was noticed when the output aperture was reduced to below 1.5 mm, but the size of the mode remained relatively unchanged. Larger output apertures were observed to permit multi-spatial mode operation at higher powers, as expected.

In summary, a diffractive mode-selecting mirror was designed to produce a square flat-top mode with very high modal discrimination. Alternate shapes (circular, multiple apertures, etc.) and profiles (tapered, phase-coded, etc.) can be produced as well. The design was demonstrated using a flash-lamp-pumped Nd:YAG laser. The experimentally measured mode shape is very close to the theoretically predicted shape. The fundamental mode loss from this element was predicted to be 0.001 and experimentally measured to be 0.01 to 0.02. This very low loss makes the technique suitable for both low- and high-gain laser systems.

An aspect of the invention provides the introduction of a low-spatial-frequency phase grating inside a laser resonator employing a diffractive mode-selecting mirror substantially increases spatial mode discrimination while presenting negligible loss to the fundamental mode. This configuration has been used to design a very short, highly selective solid-state laser cavity.

An arbitrary number of custom phase-adjustment elements similar in design to custom phase-adjustment element 129 of FIG. 4 may be added to an embodiment of a laser resonator cavity, with the appropriate adjustment to the affected custom phase-conjugated diffractive mirrors.

In one embodiment, a custom phase-adjustment element is designed to dynamically adjust phase. In a particular embodiment, a liquid crystal pixel array (without polarizing elements) is used to implement a custom phase-adjustment element 129 as shown in FIG. 4. The electric field applied to each pixel adjusts the phase of that pixel. One use for such an element is to adjust for heat-induced phase changes in the gain medium.

Figure 12A:
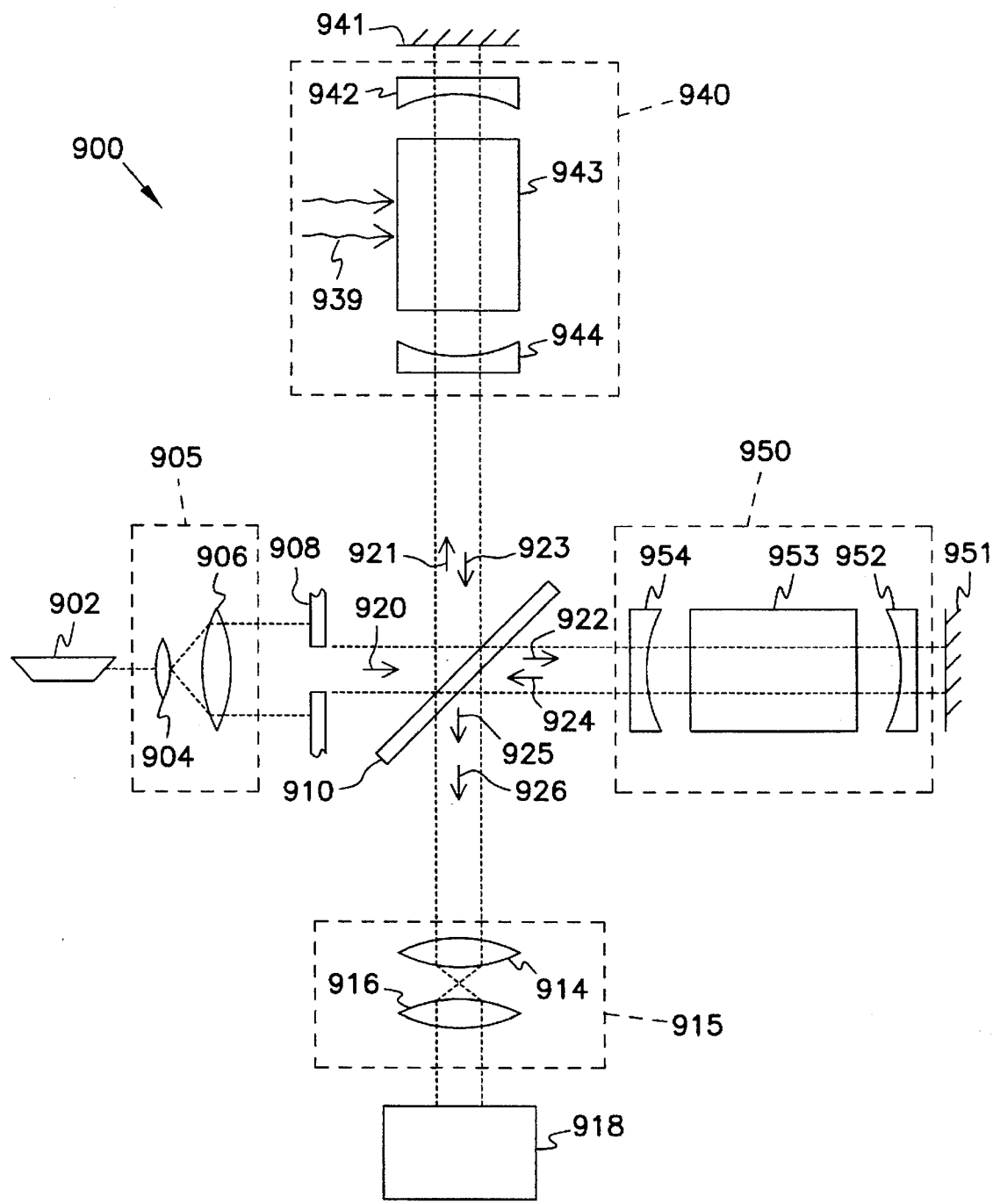

FIG. 12A is a schematic of a Michelson-type interferometer 900 which can be used to measure aberrations in laser system 940, which can then be corrected for. In particular, aberrations and distortions which are caused by heat absorption in the various elements of laser system 940, and more particularly in gain medium 943, can be measured and corrected for. Laser system 940 can be any laser, either of conventional design, or made with diffractive mirrors such as custom phase-conjugated diffractive mirror 124 of FIG. 4, or a combination system having some conventional and some diffractive elements.

In normal operation, laser system 940 would be used alone without any of the other elements shown in FIG. 12A. In such normal operation, pump light 939 would energize gain medium 943, creating an inverted population needed to cause amplification and lasing in the laser cavity between mirrors 942 and 944 of laser system 940, and also creating a "waste" heat buildup in gain medium 943, and thus distortion in the optical path through gain medium 943 in particular, but also introducing distortion in other optical path segments. In one embodiment, mirrors 942 and 944 are both partially transmissive to the wavelength of light beam 921. There is generally heat buildup to a lesser degree in each of the other elements of laser system 940, with the resultant distortion of the optical path segments.

In one embodiment, gain medium 943 is a crystal rod or slab of NdYAG. The heat buildup in gain medium 943 is often non-uniform across a cross-section and along the length of gain medium 943, due to non-uniform extraction of energy by the laser beam and/or non-uniform coupling of pump light 939 to gain medium 943, as well as non-uniform heat conduction, convection, and radiation out of gain medium 943. One primary goal of the design of optical elements for one embodiment of the present invention is to preserve the desired phase profile, even in the presence of distortions such as those due to heat. Another goal of the design of optical elements for one embodiment of the present invention is to maximize the efficiency of laser system 940 by designing mirrors (e.g., 942 and 944) and phase-adjustment elements to transfer maximum energy from the entire length and entire cross-section of gain medium 943 into the laser beam. One factor which should be taken into account in the design of the optical elements in the path of the laser beam is the fact that laser system 940 will heat up as a result of waste heat, and will therefore distort each optical path to a greater or lesser extent. This heat-up distortion will typically stabilize to a steady-state distortion value at the operating point of laser system 940, wherein the temperature will be fixed at each respective point in each element, depending on such factors as the external temperature, the energy input into each point of each element, and the energy transferred out of each point of each element. A distortion-compensating phase element is then designed to provide the complex phase conjugate of this steady-state distortion value, and thus restore the desired mode profile for laser system 940.

Referring to the exemplary embodiment shown in FIG. 12A, probe laser 902 emits a light beam into beam expander 905, which includes lenses 904 and 906, and then through iris 908. In one embodiment, the resultant light beam 920 is of a different wavelength than the operational laser wavelength of laser system 940, in order to pass more easily through mirror 944 and/or to be more easily be detected at detector 918. In one embodiment, the wavelength of the probe light beam 920 is 0.8 micrometers, as compared to the operating laser wavelength of 1.06 micrometers.

The resultant light beam 920 is directed through beam splitter 910 to generate light beams 921 and 922. Light beam 921 is directed into laser system 940, which is kept at an operating temperature distribution (called "hot"), for example, by pump light 939. The hot laser system 940 is not necessarily at a uniform temperature throughout, and is typically hotter in some areas than in others. Laser system 940 includes mirrors 944 and 942, gain medium 943, and pump light 939. In one embodiment, one or both mirrors 942 and 944 are partially transmissive at the wavelength of laser system 940's normal operating mode, in order to allow laser amplification, but are more transmissive to the wavelength of the probe light beam 920. (Light beams 920 through 926 are all the same wavelength) Light beam 921, after passing through hot laser system 940 is reflected by mirror 941, passes again through laser system 940, and emerges as light beam 923.

Light beam 922 is directed into laser system 950, which corresponds to hot laser system 940, but is kept at a room temperature distribution (called "cold"), and is not heated by, for example, a pump light source similar to 939. The cold laser system 950 is not necessarily at a uniform temperature throughout, but is typically at a uniform room temperature. Laser system 950 includes mirrors 954 and 952, and gain medium 953 each corresponding to components in laser system 940. Light beam 922, after passing through cold laser system 950 is reflected by mirror 951, passes again through laser system 950, and emerges as light beam 924.

The present invention can be used in laser systems having conventional spherical mirrors for mirrors 942 and 944, or one can be spherical and the other can be flat, or either mirror 942 or 944 can be a diffractive mirror such as custom phase-conjugated diffractive mirror 124 as shown in FIG. 4 and the other a flat mirror such as mirror 121 of FIG. 4, or both mirrors can be diffractive such as custom phase-conjugated diffractive mirrors 124 and 124' as shown in FIG. 5, or either mirror 942 or 944 can be a diffractive mirror such as custom phase-conjugated diffractive mirror 124 as shown in FIG. 4 and the other a conventional curved mirror such as shown for mirror 944 of FIG. 12A. U.S. Pat. No. 5,255,283 by Bélanger teaches a circular mode-selecting phase-conjugating mirror used to establish a radially-tailored circularly-symmetric profile, and the present invention can be used to correct for distortions in a laser having such a Bélanger-type graded-phase mirror.

Figure 12B:
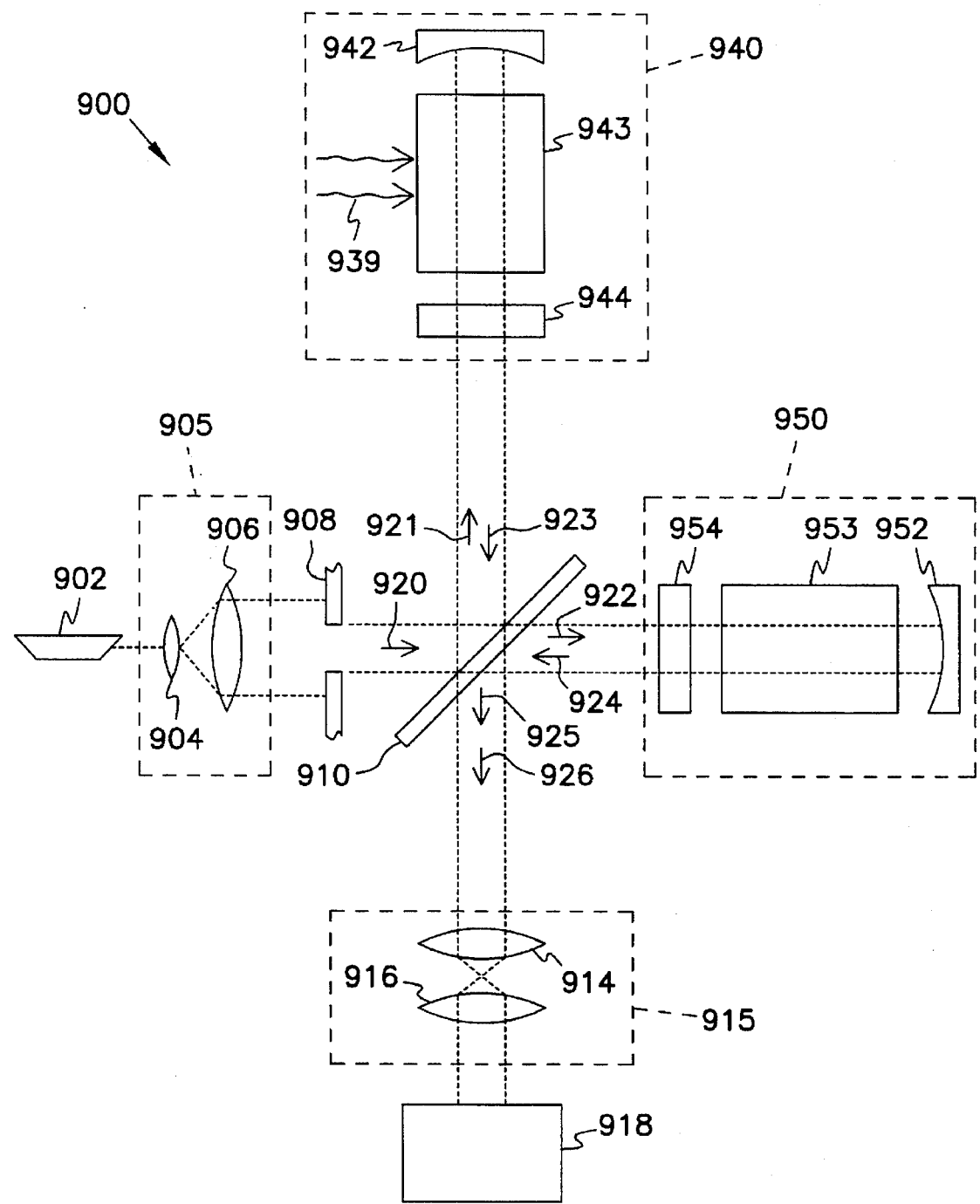

In one embodiment, shown in FIG. 12B, mirror 942 is a fully-reflecting mirror, for example a custom phase-conjugated diffractive mirror 124 designed as described for FIG. 2, 3, 4, or 5 elsewhere in this specification; and mirror 952 is a substantially similar mirror, and mirrors 941 and 951 can be omitted.

In one embodiment, a mode-discriminating custom phase-adjustment element such as element 127 of FIG. 3 or element 129 or FIG. 4 is placed between gain medium 943 and either or both mirrors 942 and 944 (at least one of which is a mode-shaping diffractive mirror such as mirror 124 of FIG. 4), and a substantially similar corresponding phase-adjustment element 127 or 129 is placed between gain medium 953 and the corresponding mirror 952 and/or 954; thus each element in cold laser system 950 matches the corresponding element in laser system 940.

In another embodiment, the optical elements of cold laser system 950 act to compensate for the refractive effects of light beams 921 and 923 passing through mirrors 942 and 944 of hot laser system 940.

In another embodiment, all of the optical elements of cold laser system 950 are replaced by a series of lenses and phase plates which produce the same optical effect as laser system 950 (which is the equivalent to a cold version of laser system 940). In such an embodiment, the motivation is to provide an "ideal" version of the optical path through the optical lenses and phase plates of this stimulated laser system 950 which is to be compared with laser system 940 by interferometer 900, and a corrective compensating phase-adjustment element can be calculated and made.

In another embodiment otherwise similar to FIG. 12A, all of the optical elements of cold laser system 950 are removed, and the difference between the aberration from laser system 940 when laser system 940 is "off" (or cold) and "on" (or hot) are calculated (i.e., the fringe pattern change is measured). This method tends to a more complex fringe pattern calculation than the above methods.

Figure 14:
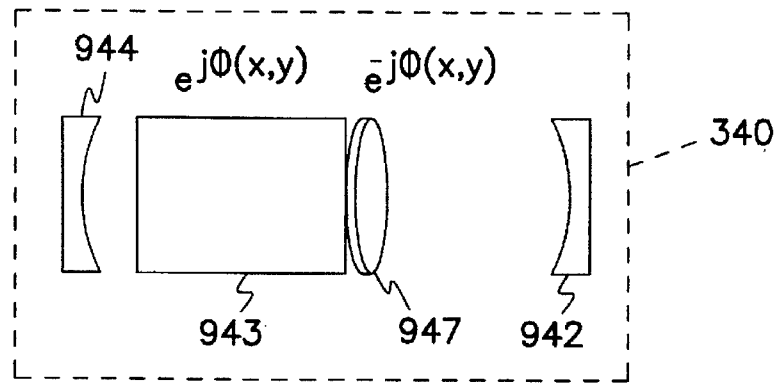
FIG. 14 is a schematic of a corrected laser system 340 having a compensating diffractive element 947 close to gain medium 943.
Figure 15:
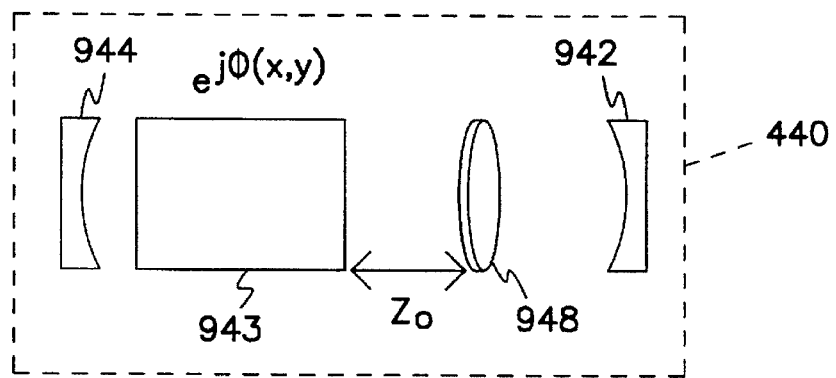
FIG. 15 is a schematic of a corrected laser system 440 having a compensating diffractive element 948 at point $z_0$ farther from gain medium 943.

Light beam 923 is directed through beam splitter 910 and the portion passing through emerges as light beam 925. Light beam 924 is directed at beam splitter 910 and the portion reflecting emerges as light beam 926. Light beams 925 and 926 then combine to form a resultant interference pattern, which is then focussed by imaging system 915 onto detector 918. Imaging system 915 includes lenses 914 and 916 in this embodiment. In one embodiment, imaging system 915 is adjusted to produce an image at detector 918 of the wavefronts at a point z in laser system 940. In one such embodiment, detector 918 is comprised of a CCD camera connected to a computer for analyzing fringes. In one such embodiment, point z is at one end of the crystal used for gain medium 943, such as is shown in FIG. 14. In another such embodiment, point z is at $z_0$ which is at a distance from the end of the crystal used for gain medium 943, such as is shown in FIG. 15. In yet another such embodiment, point z is at the surface of mirror 942 which is at a distance from the end of the crystal used for gain medium 943, such as is shown in FIG. 16.

Figure 16:
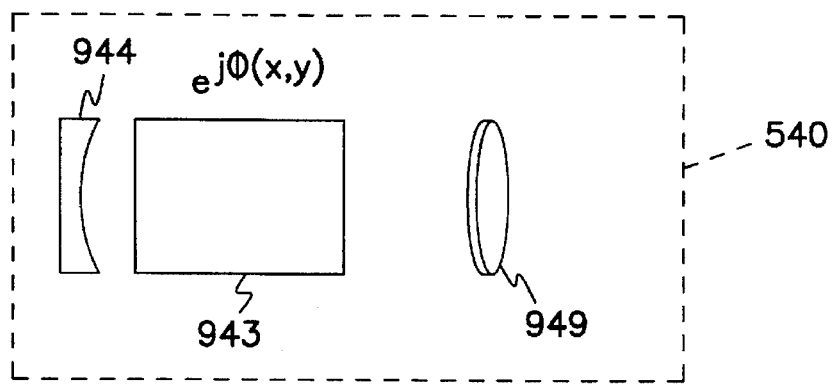
FIG. 16 is a schematic of a corrected laser system 540 having a compensating diffractive element 949 merged into one of the cavity mirrors.

In yet another such embodiment, point z is at the surface of one end of the crystal used for gain medium 943, and then calculating the effect of propagating that calculated phase profile to the plane of mirror 942 (using the method described for FIG. 4 above) to calculate and fabricate mirror 949 to replace mirror 942 such as is shown in FIG. 16.

The fringes of the resultant interference pattern represent the difference in the optical path between the hot laser system 940 and the cold laser system 950, and thus the distortion due to heat. The fringes of the resultant interference pattern are converted by standard techniques of interferometry into an optical phase function for the wavelength of laser system 940. The particular interference pattern for the wavelength $\lambda_1$ of probe beam 920 must be scaled for the operating wavelength $\lambda_2$ of laser system 940. In one embodiment, this optical phase function is expressed in the form $a(x,y) = e^{(j \phi(x,y))}$, where $\phi(x,y)$ is the two-dimensional phase distortion, which is typically primarily due to crystal distortions in gain medium 943.

In order to correct for the phase distortions of gain medium 943, a distortion-compensating phase-adjustment element is used which presents the complex phase conjugate (i.e., $e^{(-j \phi(x,y))}$) at the point z along the optical path where the optical phase function was calculated. In one embodiment, the optical phase function is calculated at a point z close to gain medium 943, and the compensating diffractive optical element 947 is placed close to gain medium 943 in order to correct for the distortion, as shown in FIG. 14. The resultant corrected laser system 340 includes mirror 944, which is partially transmissive to the wavelength of laser system 940, gain medium 943, compensating diffractive optical element 947 placed close to gain medium 943, and a fully reflective mirror for mirror 942. In one such embodiment, the corrective factor $e^{(-j \phi(x,y))}$ for the detected distortion is multiplied (or, equivalently, the $-j \phi(x,y)$ distortion-compensating exponent factor is added to the exponent factor of the mode-selecting phase adjustment calculated as described for FIG. 2, 3, 4, or 5) into the phase function for a mode-discriminating phase element (for example, as illustrated in FIG. 4, a custom phase-adjustment element 129) which is already located at the location plane for compensating diffractive optical element 947.

In another embodiment, the optical phase function is calculated at a point $z_0$ farther from gain medium 943, and the compensating diffractive optical element 948 is placed at point $z_0$ from gain medium 943 in order to correct for the distortion, as shown in FIG. 15. In such an embodiment, optical system 915 is adjusted to focus an interference pattern representative of the phase distortion as it would appear at point $z_0$, thus allowing a corrective element having the complex phase conjugate of that phase distortion to be fabricated and placed at point $z_0$. In another similar embodiment, the optical phase function is calculated at a point close to gain medium 943, and a corresponding optical phase function is calculated by calculating the effect of propagating this optical phase function to point $z_0$ and the compensating diffractive optical element 948 is placed at point $z_0$ from gain medium 943 in order to correct for the distortion, also as shown in the exemplary embodiment of FIG. 15. The resultant corrected laser system 440 includes mirror 944 which is partially transmissive to the wavelength of laser system 940, gain medium 943, distortion-compensating diffractive optical element 948 placed at point $z_0$ from gain medium 943, and a fully reflective mirror for mirror 942. In one such embodiment, the corrective distortion-compensating factor $e^{(-j \phi(x,y))}$ for the detected distortion is multiplied into the phase function for a mode-discriminating phase element (such as element 129 of FIG. 4) which is already located at the $z_0$ plane for compensating diffractive optical element 948.

FIG. 16 is a schematic of an exemplary embodiment of corrected laser system 540 having a distortion-compensating diffractive element 949 merged into one of the cavity mirrors. In one such embodiment, the distortion-compensating surface is added to (or, equivalently, placed onto, or etched into) an otherwise flat mirror which replaces a flat mirror 942 used during the measurement steps, and mirror 944 is either a spherical mirror or a diffraction mirror such as custom phase-conjugated diffractive mirror 124 of FIG. 4. In another such embodiment, a conventional spherical mirror, such as mirror 944 of FIG. 12A is used for mirror 944, and the distortion-compensating calculation is combined onto a diffractive mirror such as custom phase-conjugated diffractive mirror 124 of FIG. 4 which is used for mirror 942, and the resultant diffractive mirror is used for mirror 949. In another such embodiment, a flat mirror, such as mirror 121 of FIG. 4 is used for mirror 944, and the distortion-compensating calculation is combined onto a diffractive mirror such as custom phase-conjugated diffractive mirror 124 of FIG. 4 which is used for mirror 942, and the resultant diffractive mirror is used for mirror 949. These last two embodiments reduce the number of fabrication steps for mirror 949, since the calculation for the mode-selecting diffractive phase function can be multiplied by the distortion-compensating phase function, and a single set of fabrication steps are then used to fabricate a mirror which combines both functions.

In one embodiment, laser system 940 is tested and corrected in its production-type case and with all elements, power supplies, enclosures, fixtures, and positioning devices in place, in order to correct for all distortion sources within laser system 940. This allows compensation for all heat flows as they will occur in laser system 940 in normal operation.

In one embodiment, a custom phase-adjustment element 947 is designed to dynamically adjust phase. In a particular embodiment, a liquid crystal pixel array (without polarizing elements) is used to implement a custom phase-adjustment element 129 as shown in FIG. 4. The electric field applied to each pixel adjusts the phase of that pixel. One use for such an element is to dynamically adjust for heat-induced phase changes in gain medium 943, for instance due to external factors such as ambient temperature, or internal factors such as varying laser power outputs.

In another particular embodiment, a series of phase-adjustment elements 947 are calculated and fabricated for various distortion sources such as external factors, e.g., ambient temperature, and/or internal factors such as varying laser power outputs. This series of phase-adjustment elements 947 are then placed on a conventional fixture, such as a rotatable wheel, which allows the proper particular phase-adjustment element 947 to be positioned into the laser cavity of laser system 940 for any particular operating condition, such as various power outputs or various ambient temperatures.

In one embodiment, laser system 940 is tested and corrected using a lower-quality element for gain medium 943, in order to reduce the costs for laser system 940, since compensating diffractive optical element 947 or 948 or 949 generated by the distortion-correction method just described can compensate for some crystal distortions and imperfections. In one such embodiment, a high-quality crystal, or an optical element which has substantially identical optical properties, is used for gain medium 953, in order to generate a fringe pattern which represents the difference between the high-quality crystal (or other substituted optical element which has substantially identical optical properties to a high-quality crystal at the relevant wavelengths) used for gain medium 953 and the lower-quality crystal used for gain medium 943. This method can be particularly worthwhile in those cases where large, high-powered crystals are used, and where the higher costs of individually correcting and tuning each gain medium 943 crystal can be justified.

Figure 12C:
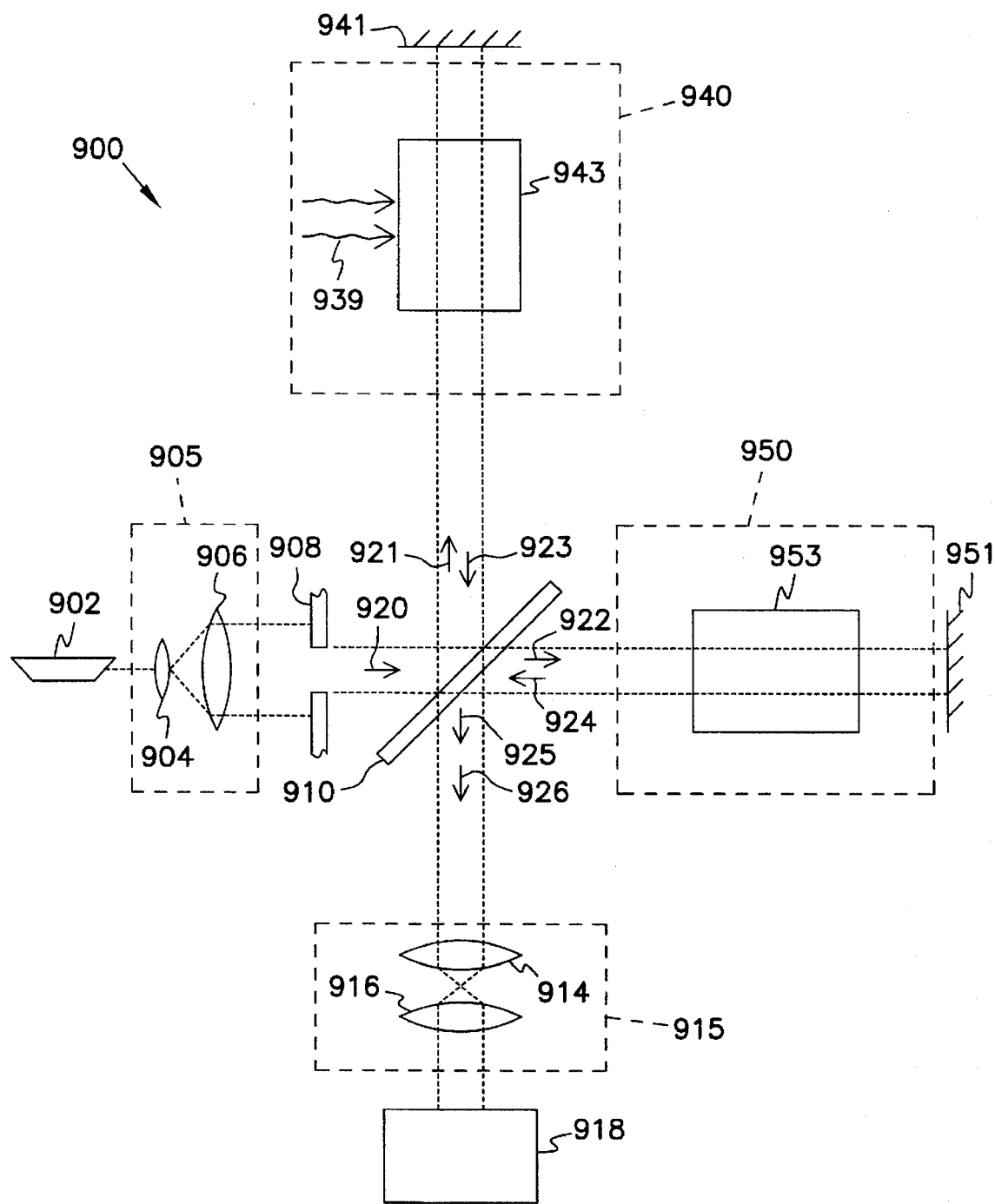

In one embodiment, shown in FIG. 12C, only a single element of laser system 940 is tested and corrected for, for instance gain medium 943. In one such embodiment, elements 942 and 944 are removed from laser system 940, leaving only gain medium 943, and mirror 941 to reflect the reference light beam; and elements 952 and 954 are removed from laser system 950, leaving only gain medium 953, and mirror 951 to reflect the reference light beam. In one such embodiment, a high-quality crystal, or an optical element which has substantially identical optical properties, is used for gain medium 953, in order to generate a fringe pattern which represents the difference between the high-quality crystal (or other substituted optical element which has substantially identical optical properties to a high-quality crystal at the relevant wavelengths) used for gain medium 953 and the lower-quality crystal used for gain medium 943.

In one embodiment, corrected laser system 340 is then replaced into Michelson-type interferometer 900 in place of laser system 940, and the above-described correction procedure is iteratively repeated. Since the above-described correction procedure will tend to change the pattern of energy transfer from the inverted population in gain medium 943, the heat-induced distortion will also change as a result of the correction being performed, giving a different distortion and thus requiring further correction iterations until a steady-state heat distribution with the best correction desired (as determined by the number of iterations the designer is willing to perform) is achieved. In addition, distortions which may be masked by larger-scale effects such as gain-medium heating initially may become evident as the sources of those distortions are corrected for.

Figure 13:
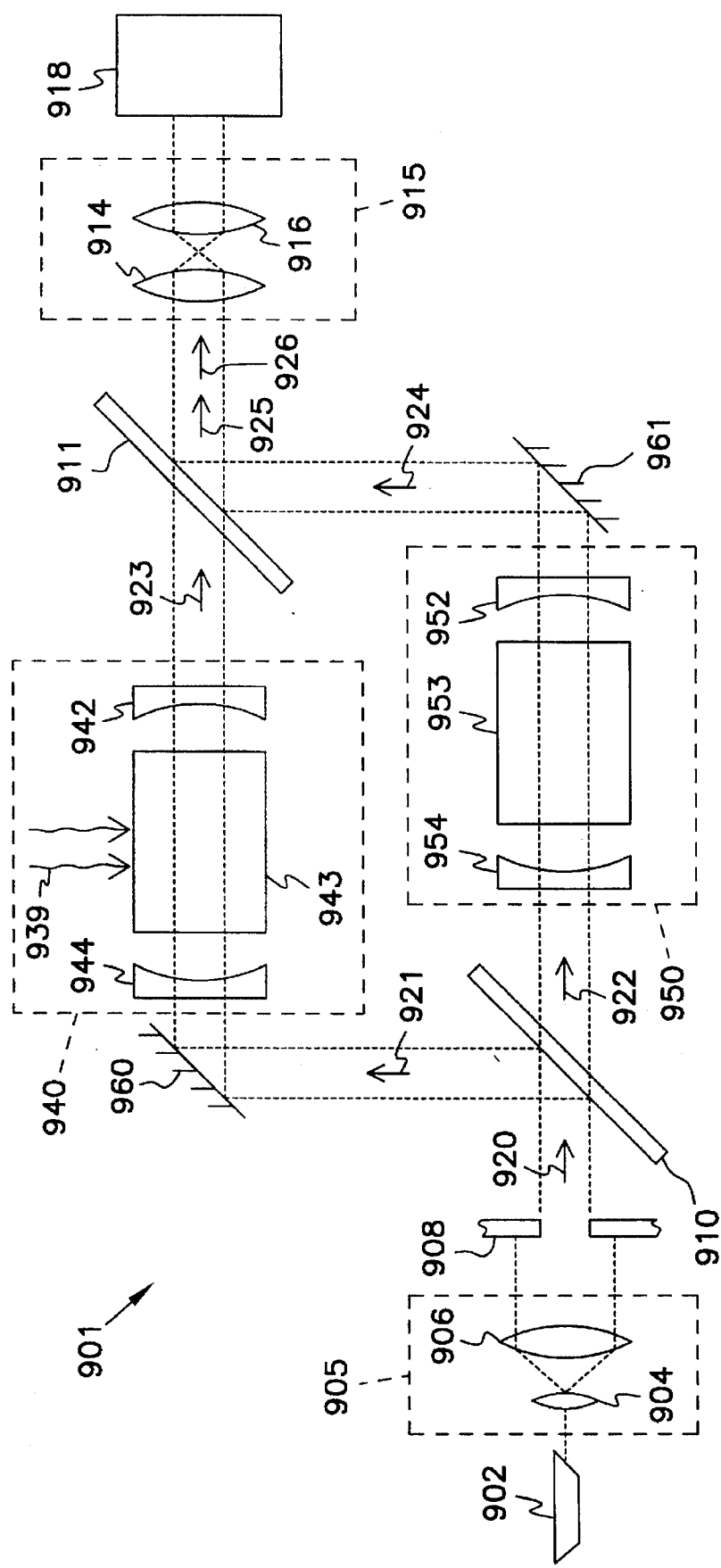

FIG. 13 is a schematic of a Mach-Zehnder-type interferometer which can also be used to measure aberrations, distortions, and imperfections in laser system 940, which can then be corrected for. This setup is used in a manner similar to that described for FIG. 12A, above, except that light beams 921 and 922, rather than being reflected by mirrors 941 and 951 respectively and passing though laser systems 940 and 950 respectively twice each, pass through (thus traversing gain mediums 943 and 953 only once) to become light beams 923 and 924 respectively. Calculation of the distortion phase function and fabrication of the needed phase compensation plates is performed in a manner corresponding to that described for FIG. 12A, above.

Figure 17:
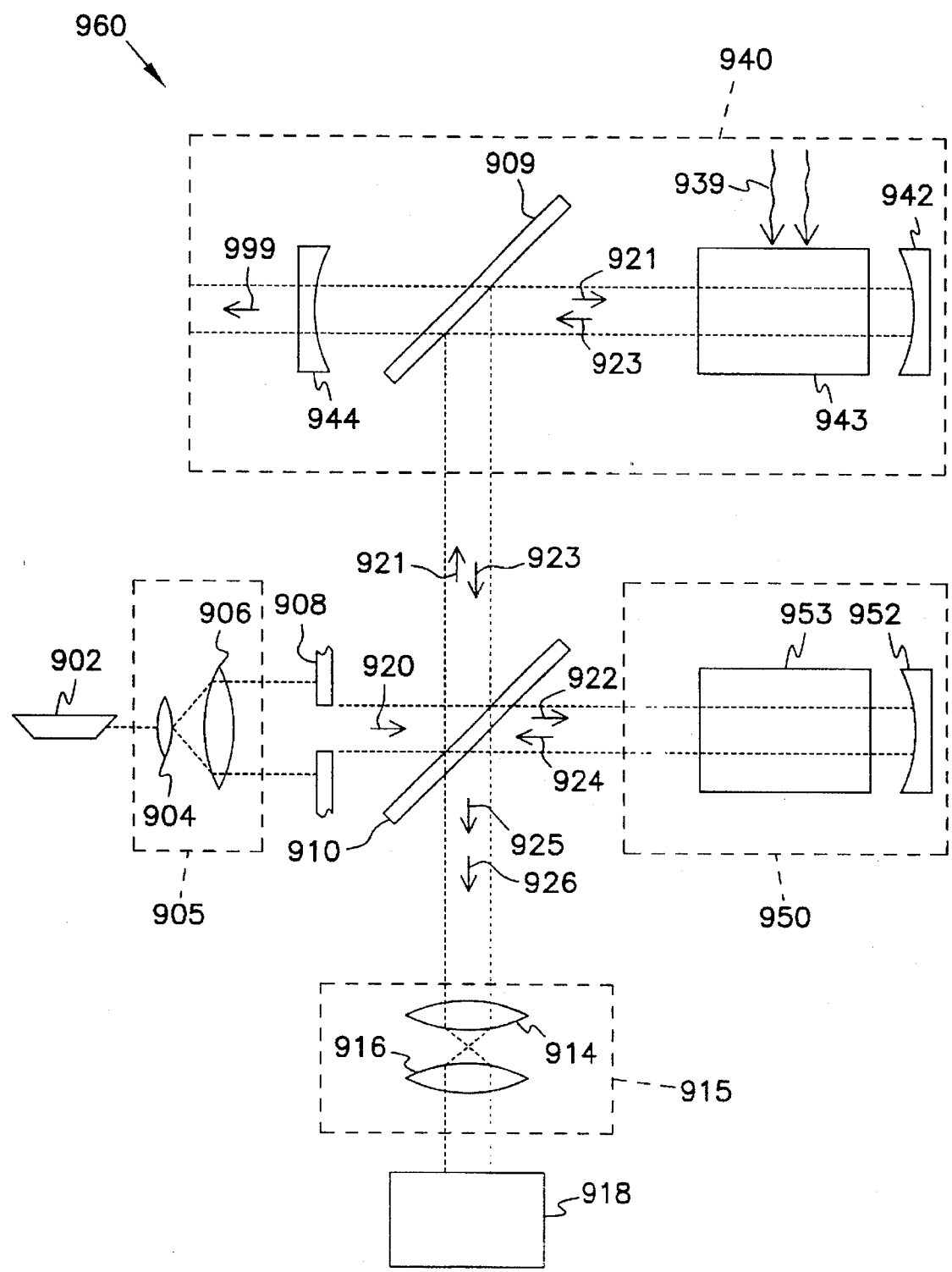

FIG. 17 is a schematic of an interferometer which can be used to measure aberrations for a laser system in which it is impractical to introduce light beam 921 through one of the mirrors of laser system 940, the aberrations which can then be corrected for. In the embodiment shown, light beam 920 from the probe laser 902 has a wavelength of 0.8 micrometers, while laser beam 999 of laser system 940 has a wavelength of 1.06 micrometers(μm). In FIG. 17, beam splitter 909 is primarily reflective at 0.8 μm and primarily transmissive at 1.06 μm. Other aspects of the use of the apparatus shown in FIG. 17 are substantially the apparatus in FIG. 12C.

One measurement method for using FIG. 17 uses a probe light beam 920 having a wavelength $\lambda_1$ which is a different wavelength from the laser wavelength $\lambda_2$ of laser beam 999 from laser system 940. In this method, beam splitter 909 is a dichroic beam splitter that is chosen to be anti-reflective (AR) coated for $\lambda_2$ and at least partially reflecting for $\lambda_1$.

A second measurement method for using FIG. 17 uses a probe light beam 920 having a wavelength $\lambda_1$ which is at a different polarization as the laser wavelength $\lambda_2$ of laser beam 999 from laser system 940. Wavelength $\lambda_1$ can be, but need not be the same wavelength as $\lambda_2$. In one embodiment, $\lambda_1$ and $\lambda_2$ are the same wavelength. In this method, beam splitter 909 is an element which transmits one polarization well and at least partially reflects another polarization. In one such embodiment, a slab of conventional uncoated glass is used for beam splitter 909, and positioned at Brewster's angle with respect to laser beam 999, and light beam 921 is incident to this beam splitter 909 at the corresponding reflective angle (which is typically not a right angle as shown in FIG. 17, but rather an oblique angle). In such a system, laser system 940 lases in a TM polarization, and is not reflected by beam splitter 909. Probe light beam 921 is chosen to be incident on beam splitter 909 with a TE polarization, causing at least some of light beam 921 to be reflected into gain medium 943. In the embodiment shown in FIG. 17, "cold" laser system 950 is not a complete laser system, in that mirror 954 is not used, since mirror 944 is not in the path of light beam 921 or 923.

It is to be understood that the above description is intended to be illustrative, and not restrictive. Many other embodiments will be apparent to those of skill in the art upon reviewing the above description. For instance, a point z specified within the laser cavity is described above, but a person skilled in the art could use an analogous method starting with point z outside the cavity. The scope of the invention should, therefore, be determined with reference to the appended claims, along with the full scope of equivalents to which such claims are entitled.

What is claimed is:

1. A method for making a phase-distortion-compensating element for a laser resonator, the laser resonator including a first laser element, the laser resonator having a laser beam that has an optical path the method comprising the steps of:
   generating a first and a second light beam;
   modifying the first light beam by passing the first light beam though the first laser element to generate a first modified laser beam, the first laser element having a phase-distortion;
   modifying the second light beam by passing the second light beam through a second laser element to generate a second modified light beam;
   combining the first and second modified light beams to generate an interference pattern;
   generating a complex phase conjugate function of an optical phase function representative of the interference pattern; and
   imposing a pattern representative of the complex phase conjugate function onto the phase-distortion-compensating element, thereby substantially reducing a phase aberration of the laser beam.

2. The method according to claim 1, wherein the phase-distortion-compensating element is a diffractive element.

3. The method according to claim 2, wherein the phase-distortion is substantially due to heat.

4. The method according to claim 2, wherein the phase-distortion is substantially due one or more of the following: heat, heat flows, ambient temperature, varying laser-power outputs, gain-medium distortions, and gain-medium imperfections, alone or in combination.

5. The method according to claim 1, further comprising the steps of:
   calculating a complex phase conjugate function of an optical phase function calculated from the interference pattern; and
   wherein the step of forming comprises forming the phase-compensation feature that is imposed on the phase-distortion-compensating element to have the calculated complex phase conjugate function.

6. The method according to claim 5, wherein the phase-distortion is substantially due to heat.

7. The method according to claim 3, wherein the phase-distortion is substantially due one or more of the following: heat, heat flows, ambient temperature, varying laser-power outputs, gain-medium distortions, and gain-medium imperfections, alone or in combination.

8. The method according to claim 1, wherein the phase-distortion is substantially due to heat.

9. The method according to claim 1, wherein the phase-distortion-compensating element is merged into the first laser element.

10. The method according to claim 1, wherein a wavelength of the laser beam is substantially different than a wavelength common to the first and second light beam.

11. The method according to claim 1, wherein the phase-distortion is substantially due one or more of the following: heat, heat flows, ambient temperature, varying laser-power outputs, gain-medium distortions, and gain-medium imperfections, alone or in combination.

12. A phase-distortion-compensating element for a laser resonator, the laser resonator including a first laser element, the laser resonator having a laser beam that has an optical path the phase-distortion-compensating element made by a method comprising the steps of:
   generating a first and a second light beam;
   modifying the first light beam by passing the first light beam through the first laser element to generate a first modified light beam, the first laser element having a phase-distortion;
   modifying the second light beam by passing the second light beam through a second laser element to generate a second modified light beam;
   combining the first and second modified light beams to generate an interference pattern;
   generating a complex phase conjugate function of an optical phase function representative of the interference pattern; and
   imposing a pattern representative of the complex phase conjugate function onto the phase-distortion-compensating element, thereby substantially reducing a phase aberration of the laser beam.

13. The phase-distortion-compensating element according to claim 12, wherein the phase-distortion-compensating element is a diffractive element.

14. The phase-distortion-compensating element according to claim 13, wherein the phase-distortion is substantially due to heat.

15. The phase-distortion-compensating element according to claim 12, further comprising the step of:
   calculating a complex phase conjugate function of an optical phase function calculated from the interference pattern; and
   wherein the step of imposing comprises forming the pattern that is imposed on the phase-distortion-compensating element to have the calculated complex phase conjugate function.

16. The phase-distortion-compensating element according to claim 15, wherein the phase-distortion is substantially due to heat.

17. The phase-distortion-compensating element according to claim 12, wherein the phase-distortion is substantially due to heat.

18. The phase-distortion-compensating element according to claim 12, wherein the phase-distortion-compensating element is placed substantially adjacent to an end of a gain medium in the laser resonator.

19. The phase-distortion-compensating element according to claim 12, wherein the phase-distortion-compensating element is merged into a mirror of the laser resonator.

20. The phase-distortion-compensating element according to claim 12, wherein the phase-distortion-compensating element includes a diffractive feature made by a method comprising the steps of:

specifying a first beam mode profile;

calculating a second beam mode profile as a function of propagating the first beam mode profile through a propagation segment, wherein the step of calculating the second beam mode profile includes compensation for a phase-distortion;

calculating an element transmittance of the diffractive element by dividing a phase conjugate of the second beam mode profile by the second beam mode profile to obtain a quotient; and forming the diffractive feature having the calculated element transmittance.

21. The phase-distortion-compensating diffractive element according to claim 20, wherein the diffractive element is a mirror.

22. The phase-distortion-compensating diffractive element according to claim 21, wherein the phase-distortion is substantially due to heat.

23. The phase-distortion-compensating diffractive element according to claim 20, wherein the phase-distortion is substantially due to heat.

24. The phase-distortion-compensating diffractive element according to claim 20, wherein the diffractive element is a custom phase-adjustment element.

25. The phase-distortion-compensating diffractive element according to claim 24, wherein the phase-distortion is substantially due to heat.

26. The phase-distortion-compensating element according to claim 12, wherein the phase-distortion-compensating element is merged into the first laser element.

27. A laser resonator having reduced phase distortion the laser resonator having a laser beam that has an optical path, the laser resonator comprising:

a first laser element; and a first phase-distortion-compensating element, the first phase-distortion-compensating element made by a method comprising the steps of:

generating a first and a second light beam;

modifying the first light beam by passing the first light beam through the first laser element to generate a first modified light beam, the first laser element having a first phase-distortion;

modifying the second light beam by passing the second light beam through a second laser element to generate a second modified light beam;

combining the first and second modified light beams to generate a first interference pattern;

generating a first complex phase conjugate function of an optical phase function representative of the first interference pattern; and imposing a pattern representative of the first complex phase conjugate function onto the first phase-distortion-compensating element, thereby reducing a first phase aberration of the laser beam.

28. The laser resonator according to claim 27, wherein the first phase-distortion is due, at least in part, to a first heat distribution.

29. The laser resonator according to claim 27, further comprising a second phase-distortion-compensating element, the second phase-distortion-compensating element made by a method comprising the steps of:

generating a third and a fourth light beam;

modifying the third light beam by passing the third light beam through the first laser element to generate a third modified light beam, the first laser element having a second phase-distortion;

modifying the fourth light beam by passing the fourth light beam through the second laser element to generate a fourth modified light beam;

combining the third and fourth modified light beams to generate a second interference pattern;

generating a second complex phase conjugate function of an optical phase function representative of the second interference pattern; and imposing a pattern representative of the second complex phase conjugate function onto the second phase-distortion-compensating element, thereby reducing a second phase aberration of the laser beam.

30. The laser resonator according to claim 29, wherein the second phase-distortion is due, at least in part, to a second heat distribution.

31. The laser resonator according to claim 30, further comprising:

a fixture coupled to the second phase-distortion element, the fixture operable to optionally position the second phase-distortion-compensating element in the optical path of the laser beam.

32. The laser resonator according to claim 21, the method further comprising the steps of:

generating a third and a fourth light beam;

modifying the third light beam by passing the third light beam through the first laser element to generate a third modified light beam, the first laser element having a second phase-distortion;

modifying the fourth light beam by passing the fourth light beam through the second laser element to generate a fourth modified light beam;

combining the third and fourth modified light beams to generate a second interference pattern;

generating a second complex phase conjugate function of an optical phase function representative of the second interference pattern; and imposing a pattern representative of the second complex phase conjugate function onto the first phase-distortion-compensating element, thereby reducing a second phase aberration of the laser beam.

33. The laser resonator according to claim 32, wherein the first phase-distortion-compensating element includes a liquid crystal layer.

34. The laser resonator according to claim 27, wherein the first phase-distortion is substantially due one or more of the following: heat, heat flows, ambient temperature, varying laser-power outputs, gain-medium distortions, and gain-medium imperfections, alone or in combination.

35. A phase-distortion-compensated laser resonator having reduced phase distortion, the laser resonator having a laser beam that has an optical path, the laser resonator comprising:

a laser gain medium within the laser resonator;

a laser feedback element optically coupled to the laser gain medium; and a first phase-distortion-compensating element for reducing a first phase distortion within the laser resonator, the first phase-distortion-compensating element positioned within the laser resonator such that an optical wavefront in the optical path is incident to the first phase-distortion-compensating element, the first phase-distortion-compensating element including a space-varying phase-function pattern that reduces the first phase distortion to thereby produce the laser beam having a more uniform phase front than the laser resonator produces without the space-varying phase-function pattern, whereby energy is more efficiently transferred from the gain medium to the laser beam.

36. The laser resonator according to claim 35, wherein the first phase distortion is substantially due to a first heat distribution in the laser gain medium.

37. The laser resonator according to claim 35, further comprising:

a second phase-distortion-compensating element, the second phase-distortion-compensating element having a space-varying phase function that compensates for a second phase distortion.

38. The laser resonator according to claim 37, wherein the second phase-distortion is substantially due to a second heat distribution in the laser gain medium.

39. The laser resonator according to claim 38, further comprising:

a fixture coupled to the second phase-distortion element, the fixture operable to optionally position the second phase-distortion-compensating element in the optical path of the laser beam.

40. The laser resonator according to claim 35, wherein the first phase-distortion-compensating element includes a liquid crystal layer.

41. The laser resonator according to claim 35, wherein the first phase-distortion-compensating element includes a phase function representative of a complex-phase conjugate of the first phase distortion.

42. The laser resonator according to claim 35, wherein the first phase distortion is substantially due one or more of the following: heat, heat flows, ambient temperature, varying laser-power outputs, gain-medium distortions, and gain-medium imperfections, alone or in combination.

43. A phase-distortion-compensating laser element for reducing a first heat-generated phase distortion in a laser resonator, the laser resonator having a laser beam that has an optical path, the laser resonator including a laser gain medium within the laser resonator and a laser feedback element optically coupled to the laser gain medium, the phase-distortion-compensating laser element comprising:

a diffractive surface positioned along the optical path such that an optical wavefront of the laser beam is incident to the diffractive surface, the diffractive surface including a space-varying phase function that reduces the first heat-generated phase distortion such that the laser resonator produces a laser beam having a more uniform phase front than the laser resonator produces without the space-varying phase-function.

44. The phase-distortion-compensating element according to claim 43, wherein the space-varying phase function includes a complex phase conjugate function of a phase difference between the optical path in the laser resonator and another optical path.

45. The phase-distortion-compensating element according to claim 43, wherein the phase-distortion-compensating element is merged into the laser gain medium and the diffractive surface is at an optical face of the laser gain medium.

* * * * *

UNITED STATES PATENT AND TRADEMARK OFFICE
CERTIFICATE OF CORRECTION

PATENT NO. : 5,627,847

DATED : May 6, 1997

INVENTOR(S) : James R. Leger

It is certified that error appears in the above-identified patent and that said Letters Patent is hereby corrected as shown below:

On the title page, item: [56] References Cited - Other Publications", please add --A.G. Fox and T. Li, "Resonant Modes in a Maser Interferometer," Bell Syst. Techn. J., 40, 453-488 (March 1961).

V. Kermene, A. Savoit, M. Vampouille, B. Colombeau, C. Froehly, and T. Dohnalik, "Flattening of the spatial laser beam profile with low losses and minimal beam divergence," Opt. Lett., 17, 859-861 (1992).

J.R. Leger, M.L. Scott, P. Bundman, and M.P. Griswold, "Astigmatic wavefront correction of a gain-guided laser diode array using anamorphic diffractive microlenses," Proc. SPIE, 884, 82-89 (Jan. 11-12, 1988).

J.R. Leger, "Miniature external cavities for coherent-beam combining," *Tech Digest, Opt. Soc. of Am. Annual Meeting*, Boston, MA, 14-15 (November 5, 1990).

James R. Leger and Greg Mowry, "External diode-laser-array cavity with mode-sleecting mirror," Appl. Phys. Lett., 63, 2884-2886 (Nov. 1993).

S. De Silvestri, V. Magni, O. Svelto, and G. Valentini, "Lasers with Super-Gaussian Mirrors," IEEE J. Quantum Electron, QE-26, 1500-1509 (September 1990).--.

UNITED STATES PATENT AND TRADEMARK OFFICE
CERTIFICATE OF CORRECTION

PATENT NO. : 5,627,847

DATED : May 6, 1997

INVENTOR(S) : James R. Leger

It is certified that error appears in the above-identified patent and that said Letters Patent is hereby corrected as shown below:

At Column 5, line 10, please delete "sart" and insert --sqrt--.

At Column 25, line 35, please delete "path the method" and insert --path, the method--.

At Column 25, line 38, please delete "though" and insert --through--.

Signed and Sealed this

Seventh Day of October, 1997

Attest:

BRUCE LEHMAN

*Attesting Officer*   Commissioner of Patents and Trademarks